United States Patent
Seki

(10) Patent No.: US 10,328,593 B2
(45) Date of Patent: Jun. 25, 2019

(54) INTERNAL SPLITTING METHOD OF CROSS-SECTION OF END OF METAL PLATE OR METAL ROD, MANUFACTURING METHOD OF METAL CONTAINER AND METAL PIPE BY THE INTERNAL SPLITTING METHOD AND JOINING METHOD OF METAL COMPONENTS

(71) Applicant: SEKI PRESS CO. LTD., Ibaraki (JP)

(72) Inventor: Masakatsu Seki, Hitachi (JP)

(73) Assignee: Seki Press Co., Ltd., Ibaraki (JP)

( * ) Notice: Subject to any disclaimer, the term of this patent is extended or adjusted under 35 U.S.C. 154(b) by 675 days.

(21) Appl. No.: 14/905,004

(22) PCT Filed: Jul. 22, 2014

(86) PCT No.: PCT/JP2014/069984
§ 371 (c)(1),
(2) Date: Jan. 14, 2016

(87) PCT Pub. No.: WO2015/012408
PCT Pub. Date: Jan. 29, 2015

(65) Prior Publication Data
US 2016/0144523 A1 May 26, 2016

(30) Foreign Application Priority Data
Jul. 23, 2013 (JP) .................................. 2013-152248

(51) Int. Cl.
*B26D 3/28* (2006.01)
*B21F 13/00* (2006.01)
(Continued)

(52) U.S. Cl.
CPC .............. *B26D 3/28* (2013.01); *B21F 13/00* (2013.01); *B21J 5/02* (2013.01); *B21J 5/10* (2013.01); *B23P 11/00* (2013.01)

(58) Field of Classification Search
CPC .......... B21J 5/01; B21J 5/10; B21J 5/02; B21J 5/06; B21J 5/12; B26D 3/28; B23P 11/00; B21F 13/00; B23D 23/02; F16B 17/004
See application file for complete search history.

(56) References Cited

U.S. PATENT DOCUMENTS 4,970,782 A * 11/1990 Andersen ............... H01R 43/16
29/874

FOREIGN PATENT DOCUMENTS

JP 61-129241 A 6/1986
JP 05-092227 A 4/1993
(Continued)

OTHER PUBLICATIONS

JP Office Action for Japanese Application No. 2013-152248, daated Oct. 30, 2014.

*Primary Examiner* — Jacob J Cigna
*Assistant Examiner* — Lee A Holly

(57) ABSTRACT

Provided is a method for internal splitting in the cross-section of the end of a metal plate or a metal rod. The method permits free-adjustment of the width and length of incision of the internal split and gives smooth and even surfaces to the cut face of the internal split for an accurate internal splitting in the cross-section of the end of a metal plate or a metal rod only at the desired position. The invention also provides a method for manufacturing a metal container and a metal pipe by that splitting method and a method for joining metal components. The present invention includes the steps of: a process to form a crevice by abutting a splitting punch or a cleaving punch on the cross-section of the end of the metal plate or the metal rod using a means for determining the width of the internal split; and a process to advance the internal splitting further by repeating the press-splitting on the crevice multiple times using a splitting punch or a cleaving punch. The invented method uses a (Continued)

clamping die, at least one side of which has an opening and a clamping margin to pinch both sides of the metal plate or two opposed positions on the circumference of the metal rod. Every time of each operation step, the clamping die is positioned in advance in accordance with the position of the tip of the intended internal split.

17 Claims, 20 Drawing Sheets

(51) Int. Cl.
  *B23P 11/00* (2006.01)
  *B21J 5/02* (2006.01)
  *B21J 5/10* (2006.01)

(56) References Cited

FOREIGN PATENT DOCUMENTS

| | | | |
|---|---|---|---|
| JP | 08-300082 | A | 11/1996 |
| JP | 09-220637 | A | 8/1997 |
| JP | 2002-045940 | A | 2/2002 |
| JP | 2002-282988 | A | 10/2002 |
| JP | 2007-234553 | A | 9/2007 |
| JP | 2012-020327 | A | 2/2012 |
| JP | 2012-094358 | A | 5/2012 |
| JP | 5165806 | B | 12/2012 |
| JP | 5219178 | B | 3/2013 |
| WO | 03/052337 | A1 | 6/2003 |
| WO | 2008/029910 | A1 | 3/2008 |

\* cited by examiner

FIG. 3A
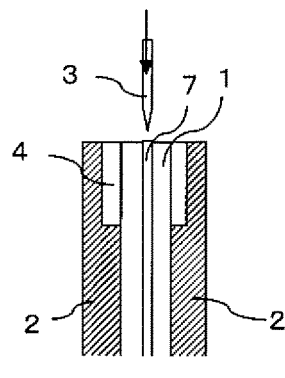
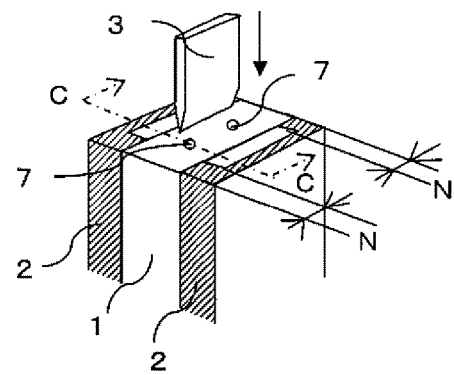
FIG. 3B
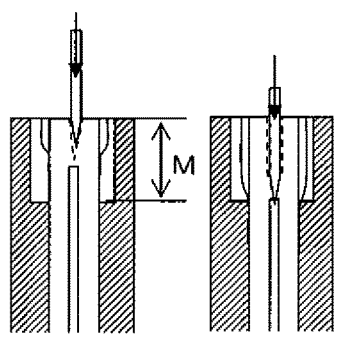
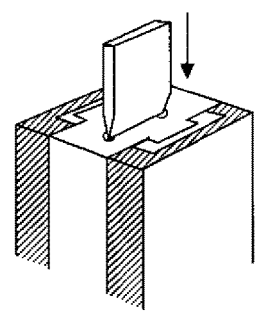
FIG. 3C
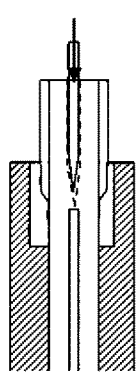
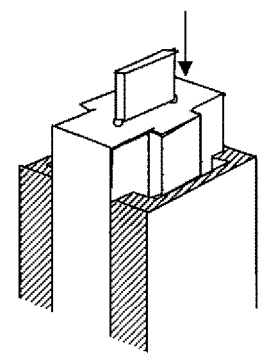
FIG. 3D
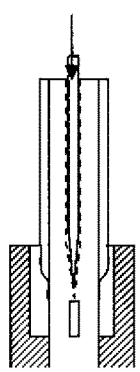
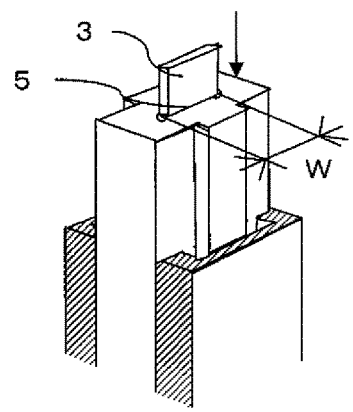

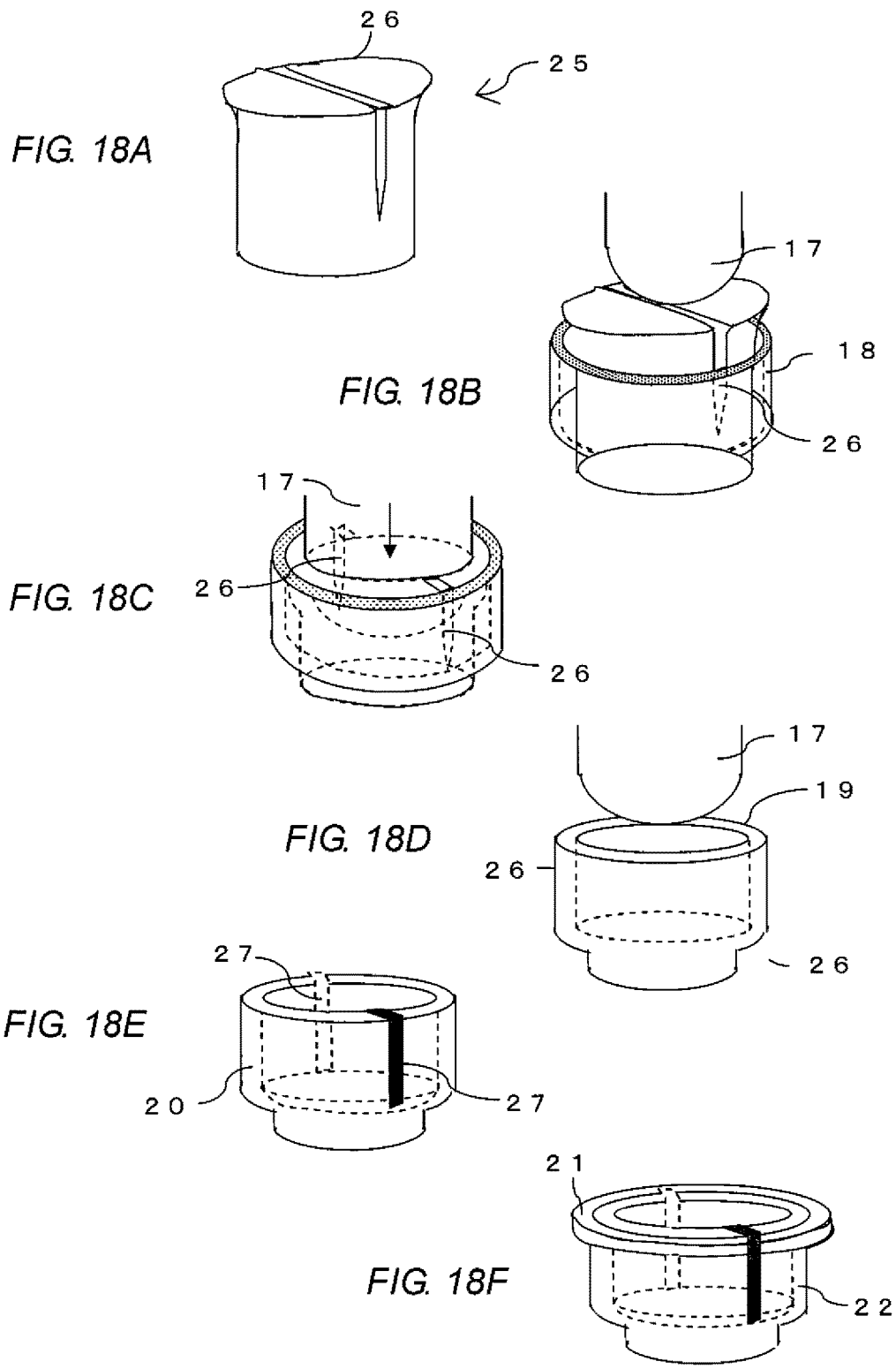

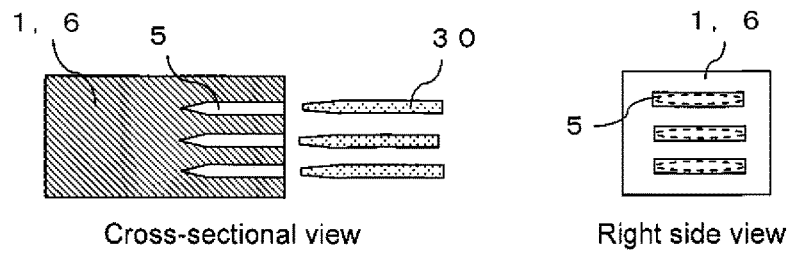
FIG. 20A  Cross-sectional view    Right side view
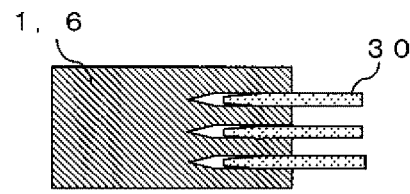
FIG. 20B
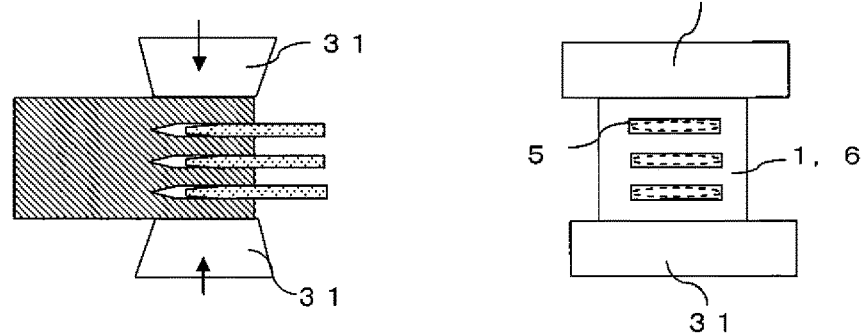
FIG. 20C
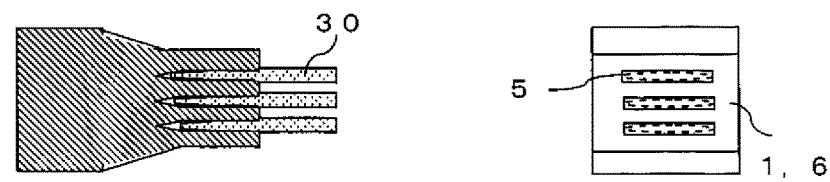
FIG. 20D

INTERNAL SPLITTING METHOD OF CROSS-SECTION OF END OF METAL PLATE OR METAL ROD, MANUFACTURING METHOD OF METAL CONTAINER AND METAL PIPE BY THE INTERNAL SPLITTING METHOD AND JOINING METHOD OF METAL COMPONENTS

TECHNICAL FIELD

The present invention relates to a method for internal splitting in the cross-section of the end of a metal plate or a metal rod. The invented method permits free-adjustment of the width and length of incision of an internal split so that the crack of the internal split does not spread to the peripheral area of the cross-section of the end in the internal splitting in the cross-section of the end of a metal plate having any of a rectangular, polygonal, or elliptical shape, or a metal rod having a cross-section of any of a circular, elliptical, rectangular, or polygonal shape, and the invented method gives smooth and even surfaces to the cut face of such an internal split. The invention further relates to a method for manufacturing a metal container and a metal pipe in a variety of shapes freely with a simple process by the invented method for the internal splitting, and also relates to a method for joining metal components that provides a more improved joining strength than that of the conventionally attained strengths.

BACKGROUND OF THE INVENTION

Until now in the field of sheet metal V-pulleys and sheet metal brake shoes, a manufacturing method such that a rotating splitting roller or a rotating cleaving roller is pressed against the outer peripheral part of a circular metal material to split such a part into two parts is known (refer to Patent literature 1).

Further, another manufacturing method of a pulley or a brake shoe has been disclosed (refer to Patent literatures 2 and 3). In such a method, the objects are manufactured by cleaving process using a cylindrical-shaped cleaving punch instead of the above-mentioned rotating splitting roller or rotating cleaving roller, or by cutting the circumferential peripheral part of a bottomed cylindrical metal body with a cutting die followed by a drawing process applying to the cut part with a press die.

The above-mentioned V-pulleys and brake shoes are made of a circular metal material. If there is a technique that is applicable to the longitudinal splitting of the end part of a metal plate having any of a rectangular, polygonal, or elliptical shape, or a metal rod having a cross-section of any of a circular, elliptical, rectangular, or polygonal shape, i.e., materials other than circular metal materials, various applications of such a technique will be promising. As a technology to respond to such needs, the inventors of the present invention have already developed a novel method for performing an end-splitting of a metal plate or a metal rod (refer to Patent literatures 4 and 5). The developed end-splitting method repeats press-splitting using a splitting punch or a cleaving punch consecutively many times, not only one time, and moves the position of a clamping die for pinching the metal plate or the metal rod at each time of the press-splitting operation to an optimized condition so that the length of the incision in the splitting can be freely adjusted within the range freely specified.

On the other hand however, metal containers are encountering a new demand although metal containers have been used in thermos bottles, vacuum isolation cooking utensils, or heat insulating containers. In recent years with the innovation of technologies in electrical and electronic devices and in transportation such as electric or fuel cell automobiles, low-cost metal containers of high-performance, high-reliability, high-durability, and high-productivity are strongly demanded as storing containers for battery electrolytic solution and as storage containers for such as gasoline, natural gas, or hydrogen. Further, there are similar needs for metal tubes (pipes) in heat-exchangers such as radiators, condensers, or oil-coolers.

As a method of manufacturing metal containers and metal pipes, it has been a conventional well known technique that predetermined components, after having been formed by press working or drawing work, are joined using welding (including laser welding) or brazing (refer to Patent literatures 6 and 7). Moreover, in some cases, a metal container of desired style is formed using another method such as hydraulic bulge forming after joining the bottom member of the container with the other end of the barrel member by welding or similar manner {Patent Literature 1}
Japanese unexamined patent application publication No. SHO 61-129241
{Patent Literature 2}
Japanese unexamined patent application publication No. HEI 8-300082
{Patent Literature 3}
Japanese unexamined patent application publication No. 2002-45940
{Patent Literature 4}
Japanese patent No. 5165806
{Patent Literature 5}
Japanese patent No. 5219178
{Patent Literature 6}
Japanese unexamined patent application publication No. 2012-94358
{Patent Literature 7}
International publication No. WO 2003/052337

SUMMARY OF THE INVENTION

The metal container described in Patent literature 6 is manufactured in a manner forming a flange on one end or both ends of a cylindrical barrel comprising a finite length metal pipe, which is open at both ends, and then a bottom plate and the flange or the bottom plate and a lid plate are laser-welded. This invention needs two times of processing by the laser-welding in forming the bottom plate and the lid plate. This need therefore brings about a problem to the invention in that an ample effect is not obtainable in terms of a significant reduction of the manufacturing cost. Further, not only in the case of Patent literature 6, it is also technically very difficult for a container comprised of a cylindrical barrel of a metal pipe to be formed into a thin and small shape item. In manufacturing a smaller and thinner metal container therefore, the process becomes complicated and requires a precise adjustment and inspection incurring a tendency to increase manufacturing cost.

The metal pipe (metal tube) described in the above-mentioned Patent literature 7 needs a process of rigidifying the junction between edges of plate materials mutually face-contacted by brazing. Therefore, there is a limit of effectiveness in reduction of the manufacturing cost. Further, when joining a junction part, it is necessary to perform an adequate process control and a detailed product inspection in order to ensure the reliability and durability of the joined part when brazing is employed including a case even when a usual welding method is employed. Therefore, a low-cost manufacturing method by a process simpler than the conventional one is strongly demanded.

In addition, the end-splitting methods described in Patent literatures 4 and 5 have a wider range of applicability selection compared to those manufacturing methods described in Patent literatures 1 to 3 in terms of shapes of metal plates and metal rods. Therefore, the methods allow manufacturing T-, L-, or Y-shaped metal plates or metal rods at a lower cost through reduction in the number of parts and in man-hours. The above-mentioned Patent literatures 4 and 5 however do not describe nor suggest the method for manufacturing metal containers or metal pipes. Thus, it is not possible to apply their end-splitting method as it is, to the internal slitting at the end part of a material.

The present invention is made to solve such problems. The inventors of the present invention conducted a review fundamentally on the splitting technique defined in the method for end splitting of the metal plate or metal rod described in the above-mentioned Patent literatures 4 and 5 and optimized the splitting conditions therefor. As a result of that review and optimization, a method has been newly established that internally splits the cross-section of the end of a metal plate or a metal rod accurately only at a desired position inside such a cross-section, not splitting all the area to the periphery of the cross-section of the end of such a material. Thus, an object of the present invention is to provide a method for internal splitting in the cross-section of the end of a metal plate or a metal rod, wherein the method permits free-adjustment of not only the length of incision of the internal split but also the width thereof and giving a smooth and even cut-surface to the internal split.

Further, another object of the present invention is to provide not only a method for manufacturing a metal container and a metal pipe having high-performance with high-reliability and high-durability that are produced by the above-mentioned method for the internal splitting in the cross-section of the end of a metal plate and a metal rod by a process simpler than the conventional one, but also a method for joining metal components that offers eased positioning between metal components and realizes high-strength and high-reliability.

The inventors of the present invention has reached this invention based on a finding that the above-stated problems can be solved. That solution in the internal splitting in the cross-section of the end of a metal plate having any of a rectangular, polygonal, or elliptical shape, or a metal rod having a cross-section of any of a circular, elliptical, rectangular, or polygonal shape includes: that a press-splitting is repeated continuous multiple times using a splitting punch or a cleaving punch, not only one time, to regulate the length (or depth) of incision produced by the internal splitting freely within the desired range; that a means for controlling the width of the internal split is used; that the structure of a clamping die which pinches the metal plate or the metal rod at each time of the press-splitting operation; and that the position of the clamping die which is moved to determine the length of incision produced by the internal splitting is optimized.

That is, the configuration of the present invention is as follows.

[1] The present invention provides a method for internal splitting in the cross-section of the end of a metal plate having any of a rectangular, polygonal, or elliptical shape, or the end of a metal rod having a cross-section of any of a circular, elliptical, rectangular, or polygonal shape, the method comprising the steps of:

forming a crevice by abutting a splitting punch or a cleaving punch on the cross-section of the end of the metal plate or the metal rod;

advancing the internal splitting further by repeating the operation of the press-splitting one time or two or more times with the splitting punch or the cleaving punch abutted on the crevice; and controlling so that a crack, which appears at the crevice-forming process and at the press-splitting process, of the internal split does not spread to the peripheral area of the cross-section of the end by using the splitting punch or the cleaving punch having a blade length of $0.8 \times W$ to $1.1 \times W$ in terms of the intended internal split width W or by forming a hole or slot at both ends of the width of the intended internal split, each being used as a means for determining the width of the internal split, wherein a clamping die that pinch both sides of the metal plate or pinch at least four opposed positions on the circumference of the metal rod is arranged in advance at each time of the crevice-forming process and the press-splitting operation, wherein the clamping die used in each of the arranging steps has a clamping margin and an alcove opening on at least one side thereof;

the clamping margin having an abutting length of $0.1 \times T$ or more, where the thickness of the metal plate or the diameter of the metal rod is expressed as T, abuts on each of both sides of the metal plate or the metal rod in the area except such an area as corresponds to the intended internal split; and the alcove opening is formed on the area except the clamping margin extending to the position same as the tip of the intended internal split from the edge of the end of the metal plate or the metal rod, and wherein at least one side of the clamping die having the clamping margin and the alcove opening is arranged in a place where the end of the alcove opening comes to the position same as the tip of the intended internal split from the edge of the end of the metal plate or the metal rod; and another side of the clamping die having the alcove opening is arranged in the place where one end of the alcove opening comes to a position same as the tip of the intended internal split from the edge of the end of the metal plate or the metal rod, or another clamping die different from the clamping die having the alcove opening is arranged so as to hold the metal plate or the metal rod at the same position as the end of the metal plate or the metal rod.

[2] The present invention provides a method for internal splitting in the cross-section of the end of a metal plate or a metal rod according to the method defined in the method [1] stated above, wherein the clamping die having the alcove opening has a sliding core die; and the clamping die is arranged at the position same as the tip of the intended internal split from the edge of the end of the metal plate or the metal rod, sliding the sliding core die in advance at each time of the crevice-forming process and the press-splitting process.

[3] The present invention provides a method for internal splitting in the cross-section of the end of a metal plate or a metal rod according to the method defined in the method [1] or method [2] stated above, wherein the alcove opening of the clamping die having the alcove opening has a height of 0.2×t to 0.8×t in the direction perpendicular to the width of the internal split when the thickness of the splitting punch or the cleaving punch is t.

[4] The present invention provides a method for internal splitting in the cross-section of the end of a metal plate or a metal rod according to the method defined in the method [3] stated above, wherein the clamping die having the alcove opening has a tapered shape in which the height of the alcove opening is formed to be lower toward the tip of the intended internal split from the end of the metal plate or the metal rod.

[5] The present invention provides a method for internal splitting in the cross-section of the end of a metal plate or a metal rod according to the method defined in any one of the methods [1] to [4] stated above, wherein the clamping die having the alcove opening has a clamping margin having a length of 0.1×T or more, where the thickness of the metal plate or the diameter of the metal rod is expressed as T, the clamping margin abutting on each side of both sides of the metal plate or the metal rod except such an area as corresponds to the intended internal split, wherein the clamping margins are provided in two directions of parallel and perpendicular to the metal plate or the metal rod.

[6] The present invention provides a method for internal splitting in the cross-section of the end of a metal plate or a metal rod comprising the steps of: forming an internal split in the cross-section of the end of the metal plate or the metal rod by the method for internal splitting defined in any one of the methods [1] to [4]; closing the crevice of the internal split collapsing using a swaging press die; performing the internal splitting by abutting the splitting punch or the cleaving punch at a position different from the position of the internal split formed immediately before; and repeating these steps to form two or more internal splits in the cross-section of the end of the metal plate or the metal rod.

[7] The present invention provides a method for internal splitting in the cross-section of the end of a metal plate or a metal rod comprising the steps of: forming an internal split in the cross-section of the end of the metal plate or the metal rod by the method for internal splitting defined in the method [5]; moving the clamping position of the clamping die that clamps circumference of the metal plate or the metal rod in the direction perpendicular to the width of the crevice of the internal split in accordance with the position where the internal split is to be formed; performing the internal splitting by abutting the splitting punch or the cleaving punch at a position different from the position of the internal split formed immediately before; and repeating these steps to form two or more internal splits in the cross-section of the end of the metal plate or the metal rod.

[8] The present invention provides a method for internal splitting in the cross-section of the end of a metal plate or a metal rod according to the method defined in the method [7], wherein, between the steps of forming an internal split in the cross-section of the end of the metal plate or the metal rod and performing the internal splitting by abutting the splitting punch or the cleaving punch on a position different from the position of the internal split formed immediately before, the closing of the crevice of the last-formed internal split is performed by collapsing using a swaging press.

[9] The present invention provides a method for internal splitting in the cross-section of the end of a metal plate or a metal rod according to the method defined in the method [1] or method [2], wherein the method further comprising the steps of: forming two or more pairs of holes or slots in the positions corresponding to the position of the intended internal split, wherein such a pair of holes or slots is comprised of holes or slots formed on both ends of the width of the intended internal split; abutting the splitting punch or the cleaving punch on the line that connects holes or slots belonging to each pair to form a crevice; and advancing the internal splitting by performing the press-splitting operation on the crevice one time or repeatedly two or more times using the splitting punch or the cleaving punch to form two or more internal splits in the cross-section of the end of the metal plate or the metal rod.

[10] The present invention provides a method for internal splitting in the cross-section of the end of a metal plate or a metal rod according to the method defined in the method [9], wherein, between the steps of forming the internal split and forming another internal split in a position different from the position of the internal split formed immediately before, the closing of the crevice of the internal split formed immediately before is performed by collapsing using a swaging press.

[11] The present invention provides a method for internal splitting in the cross-section of the end of a metal plate or a metal rod according to the method defined in any one of the methods [1] to [10], wherein, in the step of internal splitting the metal plate or the metal rod with the splitting punch or the cleaving punch in the direction parallel to the metal plate or the metal rod and in the step of advancing the internal splitting further, the press-splitting with the splitting punch or the cleaving punch is performed in a progressive transfer method composed of separated steps; and, in each press-splitting, the position of at least one end of the clamping die, which pinches both sides of the metal plate or at least two opposed positions on the circumference of the metal rod, is moved in advance in accordance with the distance from the end of the metal plate or the metal rod to the tip of the intended internal split.

[12] The present invention provides a method for manufacturing a metal container comprising the steps of: inserting a press die in the internal split of the metal plate or the metal rod, the internal split being formed in the cross-section of the end thereof by the method for internal splitting defined in any one of the methods [1] to [11], wherein the press die has a cross-section of any of a rectangular, polygonal, or elliptical shape; and deepening the insertion of the press die toward the depth of the internal split so that the inside room of the internal split is expanded to form a hollow.

[13] The present invention provides a method for manufacturing a metal container comprising the steps of: inserting a press die in the internal split of the metal plate or the metal rod, the internal split being formed in the cross-section of the end thereof by the method for internal splitting defined in any one of the methods [1] to [11], wherein the press die has a cross-section of any of a rectangular, polygonal, or elliptical shape; deepening the insertion of the press die toward the depth of the internal split so that the inside room of the internal split is expanded to form a hollow; and cutting the metal plate leaving the hollow and the metal portion that surrounds the hollow using a press, a cutter, or a laser.

[14] The present invention provides a method for manufacturing a metal container according to the method defined in the method [12] or method [13], wherein the openings of the hollow in the metal components are joined or glued each other, the hollow being formed by expanding the inside of the internal split by inserting a press die having a cross-section of any of a rectangular, polygonal, or elliptical shape, in the internal split.

[15] The present invention provides a method for manufacturing a metal pipe by making the internal split formed in the cross-section of the end of the metal plate or the meal rod by the method for internal splitting defined in any one of the methods [1] to [11] pass through the metal plate or the metal rod to the other end thereof, wherein, when the shape of the cross-section of the internal split is to be changed into a desired shape, a press-forming is additionally performed by inserting a press die having any of a rectangular, polygonal, or elliptical shape into the internal split to form a through-hole having a smooth and even hole-wall face inside the metal plate or the metal rod.

[16] The present invention provides a method for joining metal components comprising the steps of: inserting another metal plate or another metal rod into the internal split of the metal plate or the metal rod, the internal split being formed in the cross-section of the end thereof by the method for internal splitting defined in any one of the methods [1] to [11]; and joining both the metal components mutually by any one of methods of pressing, welding, fusing, bolt-tightening, rivet-tightening, or gluing.

[17] The present invention provides a method for joining metal components according to the method defined in method [16], wherein the joining between the another metal plate or the another metal rod and the split-having metal plate or the slit-having metal rod is a joining between dissimilar metals.

When performing continuously multiple times the press-forming by a splitting punch or a cleaving punch inside the cross-section of the end of a metal plate or a metal rod, the present invention prevents a crack in the metal generated at the time of the press-splitting from spreading to the peripheral area of the cross-section of the end of the metal plate or the metal rod. Therefore, the width of the internal split is controllable to a desired value. Further, in the above-mentioned multiple-repetition of the press-splitting, when determining the position of the clamping die for pinching the metal plate or the metal rod in each press-splitting operation, the length of incision of the internal split can be adjusted freely in the desired range by optimizing the structure and the locating place of the clamping die.

The present invention also allows two or more internal splits to be formed within one cross-section of the end of the metal plate or metal rod. Further, the present invention can configure an internal splitting method in the end section that is excellent in mass-productivity offering reduction of manufacturing cost by performing the press-splitting not only with a splitting punch or a cleaving punch in an unidirectional manner at a predetermined stroke but also continuously in a progressive transfer manner.

The metal components manufactured by the internal splitting method within the cross-section of the end by the present invention can change freely in the width and length of its internal split. Further, such metal components can be simply made into a desired shape of metal container and metal pipe by a post-processing through press-forming using a die having predetermined sectional shape at the internal split. Moreover, the metal container and the metal pipe by the present invention is adaptable to omission of joining process such as welding and brazing or reduction of the number of fixing points in such a joining process. It therefore becomes possible to manufacture a metal container and a metal pipe having high-reliability and high-durability.

Still more, the metal components manufactured by the method for end splitting by the present invention are easy in the metal components aligning. Therefore, the components permit employing a joining method having an unprecedented high reliability and durability by a simple operation. For example, when joining is applied on a plurality of internal splits formed in the cross-section of the end of the metal components by the present invention with the another metal components inserted therein, not only a simultaneous lump joining of a plurality of metal becomes practicable but also the joining strength and joining reliability improve significantly. Therefore, the invented method can expand its applicability into a field that requires more enhanced heat resistivity and more strengthened environmental resistance as a simple low cost joining method.

BRIEF DESCRIPTION OF THE DRAWINGS

FIGS. 3A to 3D are explanatory drawings of the process performed by the method for internal splitting in the cross-section of the end of a metal plate in the third embodiment of the present invention.

FIGS. 18A to 18F are explanatory drawings of the manufacturing process of a metal container manufactured using a metal rod the end of which is divided into two by an end splitting method.

FIGS. 20A to 20D are drawings to show a method of joining a metal plate or a metal rod, the end of which is divided, and another metal plate or another metal rod in the 14th embodiment of the present invention.

DETAILED DESCRIPTION OF THE PREFERRED EMBODIMENTS

Figures 1A, 1B, 1C, 1D:
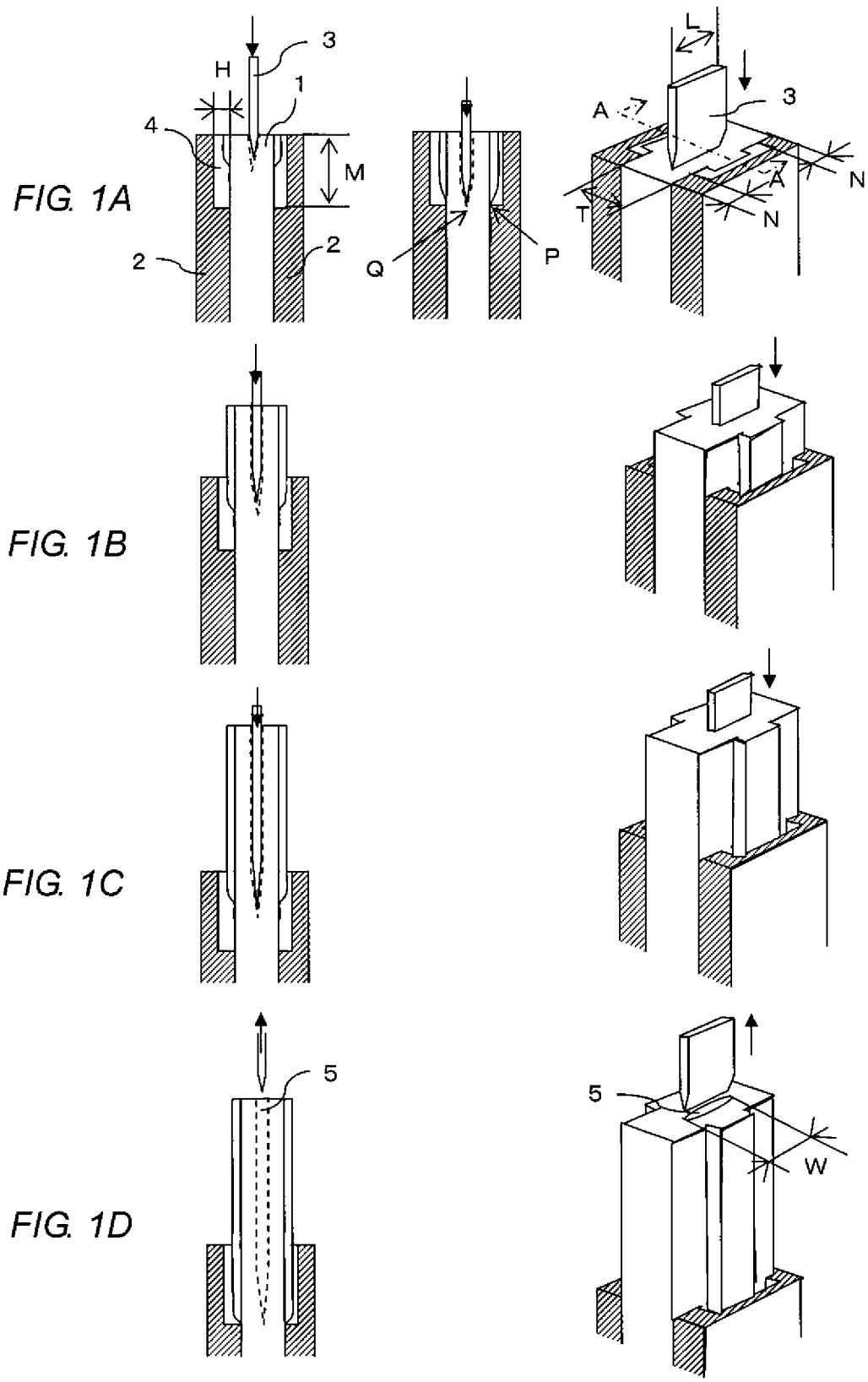
FIGS. 1A to 1D are explanatory drawings of the process performed by the method for internal splitting in the cross-section of the end of a metal plate in the first embodiment of the present invention.

In the internal splitting in the cross-section of the end of a metal plate having any of a rectangular, polygonal, or elliptical shape, i.e., shapes other than circle-like or disc-like form, or a metal rod having a cross-section of any of a circular, elliptical, rectangular, or polygonal shape, the internal splitting method of the present invention permits regulating freely the width and length of the incision of the internal split formed by the internal splitting and can form a smooth and even internal split face. These are brought mainly by the three major features stated below.

Initially, the first feature is to have a means for determining the width of the internal split.

The second feature includes the following. In a process of forming the crevice using a splitting punch or a cleaving punch and in a process of arranging in advance a clamping die that pinches the metal plate at both sides thereof or pinches the metal rod, at least, at four opposed positions on the circumference thereof at each time of the repetition of a process to perform the press-splitting at the crevice one or two times or more, it is necessary not only to secure the metal plate or the metal rod as a workpiece but also to reduce irregularity in positioning of the abutting of the splitting punch or the cleaving punch. The present invention is a method for forming an internal split in the cross-section of the end of a metal plate or a metal rod. It is therefore necessary to prevent a positional slip of the metal plate or the metal rod while the internal splitting process is in progress. On the other hand, the controlling of the width of the internal split becomes difficult if the metal plate or the metal rod is secured over the entire surface thereof intending stronger securing on the contrary. Thus, the second feature is as follows. The method uses a clamping die. At least one end of the clamping die has a clamping margin that abuts on each side of both sides of the metal plate or the metal rod over the predetermined length in the area except such an area as corresponds to the intended internal split; the clamping die further has an alcove opening formed thereon, except the clamping margin, extending up to the position same as the tip of the intended internal split from the edge of the end of the metal plate or the metal rod.

The third feature is as follows. The method arranges the clamping die in a manner described below to regulate the length of the incision of the internal split. The clamping die having the alcove opening is arranged in a place where one end of the alcove opening comes to the position same as the tip of the intended internal split from the edge of the end of the metal plate or the metal rod, and the other side of the clamping die having the alcove opening is arranged in the place where one end of the alcove opening comes to the position same as the tip of the intended split from the edge of the end of the metal plate or the metal rod. Alternatively, another clamping die different from the clamping die having the alcove opening is arranged so that the metal plate or the metal rod is held at the same position as the cross-section of the end of the metal plate or the metal rod. With this third feature, the length of the incision of the internal split can be formed within the desired range covering from the end of the metal plate or the metal rod to the other end of the alcove opening on the clamping die.

As a means for determining the width of the internal split that is the first feature, the following two are employed specifically.

As the first means, a splitting punch or a cleaving punch having a blade length approximately same as the intended slit width W is used. The blade length is adjusted in accordance with the kind and the hardness of metal of the workpiece and the intended split width W. In the present invention, the blade length is needed to be 0.8×W to 1.1×W. If the blade length is less than 0.8×W, a one-time press-splitting cannot form the internal split in the width of W, which sometime requires a repeated press-splitting on the same intended position of the internal split. This means that an efficient internal splitting cannot be achieved with such a blade length. Further, if the blade length is more than 1.1×W, a problem occurs in that a crack by the internal splitting spreads even to the peripheral area of the cross-section of the end of the metal plate or the metal rod, resulting in a situation in which the intended split width W of the internal split cannot be controlled.

As the second means for determining the width of the internal split, a hole or slot is formed on the position corresponding to both ends of the width of the intended internal split. In the viewpoint of an actual manner, the length (or the depth) of the hole or slot should usually be formed till the depth of the intended internal split so as to determine in advance the length (or the depth) of the intended internal split as designed. In the present invention, as will be mentioned later, the hole or slot may be formed in any length (or depth) within the range of the length (or the depth) of the intended internal split by jointly using the first means. By choosing in advance the position at which the hole or slot is to be formed, the width of the intended internal split can be determined. The hole or slot is formed usually by drilling but using laser-machining or punching work may be practicable when the needed depth is shallow. The cross-sectional shape of the hole or slot is enough when it is circular, elliptical, or rectangular. Although the present invention places no specific requirement for the shape, a circular shape is preferred in the viewpoint of workability. With respect to the diameter of the hole, or width of the slot, it will suffice to set their size to such an extent that the crack, which appears in the process of forming the crevice with the splitting punch or the cleaving punch and at the time of the press-splitting, does not spread to the peripheral area of the cross-section of the end of the metal plate or the metal rod. The size however should be made small within the limit where the processing does not suffer from big influence. In particular, although the size is dependent also on the shape of the internal split, 5 mm or smaller is preferable but sizes of 0.1 mm to 3 mm are more preferable when workability is taken into consideration.

The above-stated two means are for preventing the crack in the metal generated at the time of the press-slitting from spreading to the peripheral area of the cross-section of the end of the metal plate or the metal rod. By those means, the internal split can be freely formed with a desired width at any position in the cross-section of the end of the metal plate or the metal rod.

In the present invention, it is also practicable to use the above-stated two means being combined as the means for determining the width of the internal split. Such a combination may be comprised of for example the steps of: forming, in the first pressing step, the hole or slot on the both ends of the width W of the intended internal split to the length of the intended internal split; performing the press-splitting with a splitting punch or a cleaving punch; and then, repeating the press-splitting changing the punching tool to the splitting punch or the cleaving punch each having a blade length of 0.8×W to 1.1×W in terms of the intended internal split width W to advance the internal splitting. In the process that uses the composite method composed of the combination of the first and the second means, the use of the splitting punch or the cleaving punch each having a blade length of 0.8×W to 1.1×W from the first step allows the internal split being formed with the width of W without changing the punch in the middle of the processing and permits the internal splitting to proceed continuously without interruption. This practice is useful in that, as the intended internal split width W can be determined with sufficient accuracy in advance by setting the length (or the depth) of the hole or slot to be formed being made short (or shallow), the successive press splitting process that uses the splitting punch or the cleaving punch each having the blade length of 0.8×W to 1.1×W can also form the internal split in the width of W. Even if the hole (bore) or slot has a shape or a size like those of a dot or a stamp formed by a punching or other similar method, the width of the internal split can be controlled with sufficient accuracy.

In the second feature of the present invention, the length of the clamping margin, which abuts on each side of both sides of the metal plate or the metal rod in the area except such an area as corresponds to the intended internal split, is required to be 0.1×T or more, where the thickness of the metal plate or the diameter of the metal rod is expressed as T, and preferably to be 0.3×T or more. If the length of the clamping margin is less than 0.1×T, securing the metal plate or the metal rod cannot be sufficient. This causes not only such a situation that a positional fluctuation tends to occur while pressing operation but also irregularity in the abutting position of the splitting punch or the cleaving punch becomes considerable, which prevents the internal splitting step from the smooth progress. These problems are substantially solved by setting the length of the clamping margin to 0.3×T or more. On the other hand, lengthening the clamping margin to an area corresponding to the intended internal split makes it difficult to control the width of the internal split and the efficiency of the pressing step is lowered; such a lengthening therefore should be avoided. In the present invention, the clamping die is arranged in such a position that the clamping does not invade at least the area corresponding to the intended internal split. When the clamping margin has a length 0.1×T or more, preferably 0.3×T or more, at each side of both sides of the metal plate or the metal rod and the length does not lap on the area that corresponds to the intended internal split, the clamping position where the clamping die clamps may be chosen arbitrarily. The intended internal split width W is controllable by the first feature of the present invention.

In the clamping die having the alcove opening, it is preferable that the alcove opening has a height of 0.2×t to 0.8×t in the direction perpendicular to the width of the internal split when the thickness of the splitting punch or the cleaving punch is t. If the height of the alcove opening is less than 0.2×t, the clearance for the deformed metal produced from internal splitting in the press-slitting process reduces. This prevents the splitting punch or the cleaving punch from entering the intended part of the internal splitting, making the advancing of the internal splitting difficult. If the height of the alcove opening is more than 0.2×t, the clamping of the metal plate or the metal rod becomes not enough. This prevents the splitting punch or the cleaving punch from entering straight. These unfavorable states bring about a problem such that the internal split face loses its even smoothness or that the continuous progress of the multiple-times pressing process is interrupted due to fluctuation of the abutting position of the punch that may occur in the middle of the press-splitting process.

Further in the present invention, for the straight and smooth insertion and the entering of the splitting punch or the cleaving punch into the intended part of the internal splitting, it is more preferable that the alcove opening of the clamping die should have not only a height of 0.2×t to 0.8×t, but also such a tapered shape that the height of the alcove opening lowers towards the tip of the intended internal split from the end of the metal plate or a metal rod.

Next, the third feature of the present invention is explained. The present invention uses, in order to regulate the length of the incision of the internal split, a clamping die that has, on at least one side thereof, the clamping margin and the alcove opening. Other side of the clamping die is chosen in accordance with the type of punch to be used at the time of the press-splitting. In the case of using a splitting punch, a clamping die of the same form as the clamping die having the clamping margin and the alcove opening is used mostly. The metal plate or the metal rod is pinched between two clamping dies each having the clamping margin and the alcove opening, and then undergoes the press-splitting in a position held vertically or horizontally. In the case of using a cleaving punch, a clamping die of different form from the clamping die having the clamping margin and the alcove opening is used mostly. The different form includes such a structure as pinches the metal plate or the metal rod at the same place as the edge of the end of the metal plate or the metal rod. In that case, the press-slitting is performed with the metal plate or the metal rod held horizontally and the internal splitting proceeds. Therefore, the length of the internal split can be controllable by the length of the alcove opening of the clamping die which has the clamping margin and the alcove opening. Regarding the arrangement method of the clamping die, a concrete description is provided later in the explanation of the sixth embodiment of the present invention referring to drawings.

Next, a brief explanation of the process by the method for internal splitting having the third feature of the present invention is provided. When, as in the present invention, splitting or slitting the end of a metal plate having any of a rectangular, polygonal, or elliptical shape, or the end of a metal rod having a cross-section of any of a circular, elliptical, rectangular, or polygonal shape, the splitting punch and the cleaving punch for forming a split plane and the metal plate and the metal rod as a workpiece metal material all cannot be rotated, unlike in a conventional case of a circle or a cylindrical metal material such as a V-pulley or a brake shoe. Further, only one-time application of the splitting punch or a cleaving punch on the cross-section of the end of the metal plate or the metal rod merely creates a slight trace of a splitting and it is difficult to form an internal split having a sufficient length (or depth). Use of a cutter to cut partially the cross-section of a metal instead of forming by punching with the splitting punch or the cleaving punch has a difficulty in controlling freely the width of the internal slit. The cutter-method causes an unavoidable reduction of thickness in the metal plate or the metal rod attributable to the thickness of the cutting device. It is therefore difficult to apply cutter-method to a thin metal plate or a small diameter metal rod. The cutter-method requires a cleaning process of the splitting-completed face after the cutting; this means that the process is complicated. The present invention therefore performs continuously the press-splitting by a splitting punch or a cleaving punch on the end of a metal plate or a metal rod many times, in order to lengthen (or deepen) the internal split. The internal splitting method of the present invention comprises at least two processes described below.

The first process is a process of forming a crevice by the press-splitting. This process is performed in a manner pinching the metal plate at both sides thereof or pinching the metal rod, at least, at two opposed positions on the circumference thereof and thereafter abutting the splitting punch or the cleaving punch on the cross-section of the end of the metal plate or the metal rod for the press-splitting. The second process is advancing the internal splitting further. In this process, the press-splitting is advanced further by applying the splitting punch or the cleaving punch at the crevice of the internal split formed in the first process. The operation of this press-splitting is performed once or repeated two or more times until the internal splitting distance (length or depth) reaches the predetermined extent. In the first and the second processes, the clamping die that pinches the metal plate at both sides thereof or pinches the metal rod, at least, at two opposed positions on the circumference thereof, has the clamping margin and the alcove opening at least on one side thereof. This clamping die is arranged in advance at each time of the press-splitting operation in a place where one end of the alcove opening comes to a position same as the tip of the intended internal split from the edge of the end of the metal plate or the metal rod. When lengthening (or deepening) the incision of internal split further, the one end of the alcove opening of the clamping die is moved in accordance with the desired distance to the tip of the intended internal split. Thereby, the internal splitting distance in the end of the metal plate or a metal rod can be adjusted within the predetermined range.

The clamping die having the alcove opening usable for the present invention includes a clamping die having a sliding core die other than those having an opening of fixed size and position. Thereby, the forming of the internal split can employ a method such that the clamping die is arranged in a place where one end of the alcove opening comes to a position same as the tip of the intended internal split from the edge of the end of the metal plate or the metal rod with the sliding core die being slided in advance at each time of the operation of the crevice forming process and the press-splitting operation. In that case, a metal mold supporting the sliding core die works as a clamping margin for clamping the workpiece of the metal plate or the metal rod.

In the above-stated metal plate and metal rod, the rectangular shape means squares or rectangular parallelepipeds; and the polygonal shape excepting tetragons includes triangles or pentagons or other polygons having six or more sides and irregular shapes such as convex-concave shapes as well, but polygons close to the circle, a regular polygon specifically a regular 12-gon or more-cornered shapes are excluded. A metal plate having elliptical shape means such a shape that the ratio of the major axis a and the minor axis b (a/b) is 1.2 or more. Although metal materials having a sectional shape of the circular or the elliptical form is mainly used as the metal rod in the present invention, those metal materials having a rectangular or polygonal cross-section may be used as workpiece metal material.

The method for internal splitting the cross-section of the end by the present invention is a method for forming an internal split in the horizontal direction with respect to the metal plate or the metal rod having the above-stated shape. Here, the "horizontal direction" means that the internal splitting proceeds in the width-wise direction or in the depth-wise direction, wherein the internal splitting is performed in such a mode that the splitting plane spreads in the metal plate in the thickness-wise direction. In the metal rod, that term means that the cross-section of the metal rod is internally splitted in the longitudinal direction. The method for internal splitting in the present invention is capable of not only internally splitting the inside of the cross-section of the end of the metal plate or the metal rod equally but also forming the internal split in two places, or three or more places as well, at an equal or different ratio in accordance with the form and function of the forming-finished metal component. In that case, the length (or depth) of the internal split at each dividing position may be equal or different each other. When the number of the internal splits is multiple, they may be formed in an intersecting configuration like a cross not in a parallel array; they can be formed in any place.

Although there is no specific limitation of the material properties of the metal plate or the metal rod to be used by the method for internal splitting in the cross-section of the end part by the present invention, copper, aluminum, stainless steel, brass, and iron are suitable materials, because their field of application is wide, they have a great needs as high value-added metal components, and they are in demand for reduced manufacturing cost at the same time. The method is applicable also to metals harder than these metals, for example, titanium, titanium alloy, etc.

The embodiment of the internal splitting method of the end of the metal plate or the metal rod by the present invention is described below referring to drawings.

[The First Embodiment]

FIGS. 1A to 1D are explanatory drawings of the process performed by the method for internal splitting in the cross-section of the end of a metal plate 1 in the first embodiment of the present invention, wherein the press-splitting using a splitting punch 3 is performed moving a clamping die 2. In FIG. 1A, the illustration on the left side thereof shows a cross-sectional view of the perspective view on the right side thereof sectioned along the line A-A. As shown in FIGS. 1A to 1D, the internal splitting method of this embodiment comprises the steps of:

(a) Clamping both sides of a metal plate 1 by pinching with a clamping die 2, abutting a splitting punch 3 on the cross-section of the end of the metal plate 1, and performing the press-splitting to the intended internal split depth M of an alcove opening 4 provided on the clamping die 2 (refer to FIG. 1A);

(b) Moving the clamping die 2 to the intended internal split position, then clamping the metal plate 1 by pinching with the clamping die 2, and performing again the press-splitting (refer to FIG. 1B);

(c) Repeating the press-splitting with the splitting pinch 3 to advance the internal splitting to the desired depth (refer to FIG. 1C); and (d) Moving the splitting punch 3 toward the arrow-indicated direction (an upward arrow) and taking out the metal plate 1 on which an internal split 5 is formed (refer to FIG. 1D).

The depth of the internal split can be determined at the process steps (b) and (c) stated above. Eventually, the metal plate 1 comes to have an internal split in the cross-section, which is as shown in FIG. 1D. After that, a subsequent processing such as press-forming, swaging, or pressure-forming is performed to manufacture metal components having shapes like such as metal containers or metal pipes for example.

In this embodiment, the width W of the region corresponding to the intended split can be controlled by the blade length L of the splitting punch 3, as illustrated on the right side of FIG. 1D. This means that the blade length L of the splitting punch 3 is required to be within the range of $0.8 \times W$ to $1.1 \times W$. When the designed value of W is 20 mm for example, the splitting punch 3 having the length L of 16 to 22 mm is used. If the blade length L is less than $0.8 \times W$, the width of the finished internal split produced by one press-splitting processing becomes narrower than the designed width W. This impeded an efficient internal slitting process. If the blade length is more than $1.1 \times W$, the crack arising from the internal splitting spreads to the peripheral area of the cross-section of the end of the metal plate or rod. This resulted in a situation in which the controlling the internal split width was unable.

The thickness of the splitting punch 3, excepting the tip end that has a sharp blade, can be determined in accordance with the desired thickness of the intended internal split for the rear part of the punch. When the rear part of the splitting punch 3 is given a shape such as a circle, ellipse, or rectangle in its cross-section, the internal slit 5 can be worked into a desired cross-sectional shape by processing in a manner same as a usual press-forming process that uses a die having a desired shape, after internally splitting the inside of the end of the metal plate with a sharp blade edge of the splitting punch 3.

In the present invention, it is necessary to provide clamping margins in a place other than the region corresponding to the intended internal split width W (this corresponds to the width W of the internal split 5 illustrated on the right side of FIG. 1D). The clamping margins, each having a length N, are to abut severally on each side of the metal plate 1. Securing the metal plate 1 is for prevention of a positional deviation of the metal plate 1 under the press-processing and a fluctuation of the abutting position of the slitting pinch 3; thereby, a smooth progress of the internal splitting process is ensured. The length N of the clamping margin is required to be $0.1 \times T$ or more, preferably $0.3 \times T$ or more, where the thickness of the metal plate 1 is expressed as T. In the case where the length of the clamping margin was less than $0.1 \times T$, securing the metal plate 1 became not tight enough, and the positional deviation of the metal plate 1 and the fluctuation of the abutting position of the splitting pinch 3 became considerable. This prevented forming an even and smooth surface on the internal split. In the worst case, breakage occurred on the splitting punch. A problem arose in that the punching process did not progress smoothly. These problems were found to be solvable by setting the length of the clamping margin to $0.3 \times T$ or more. In this embodiment, the internal splitting is applied usually to the metal plates having a thickness T in a range of 0.1 to 100 mm; the length N of the clamping margin is therefore set to 0.01 to 10 mm or more, preferably 0.03 to 30 mm or more. The length N is required to be set considering the width W of the region that corresponds to the intended internal split width. However, the length N is little affected by the width of the metal plate 1.

In the process shown in FIGS. 1A to 1C, the internal splitting in the cross-section of the end of the metal plate 1 by the press-splitting using the splitting punch 3 is performed to the same position as the one end P of the alcove opening provided on the clamping die 2 for pinching the metal plate 1, namely to the depth M. In the abutting part on the metal plate 1 that is clamped by the clamping die 2, breakage or cleavage of structure of metal workpiece is suppressed by the compression stress given by the clamping die 2, preventing occurrence of cracking while the press-splitting with the splitting punch 3 is in progress. Therefore, the positional adjustment of the alcove opening to be provided on the clamping die 2 allows a free determination of the internal splitting distance (depth). That the one end P of the alcove opening provided on the clamping die 2 for pinching the metal plate 1 is on the same position as the tip Q of the intended internal split means that the position of the one end P of the alcove opening provided on the clamping die 2 is within the range of −3 mm to +1 mm with respect to the position of the tip Q of the intended internal split, or within −1 mm to +0.5 mm as a preferable range. The position of −3 mm with respect to the position of the tip Q means that the position of the one end P provided on the clamping die 2 is on a place 3 mm below the tip Q of the intended internal split. In contrast to this, the position of +1 mm is a place where the one end P is 1 mm upward apart from the Q and it means that the distance of spread of the internal split for the part pinched by the clamping die is 1 mm at the maximum from the position of the P to the inside. As stated above, the clamping die 2 further has a function that intercepts the spread of the internal split.

When the pressure of the press-splitting by the splitting punch 3 is high, or when the speed of that by the punch is high, there usually is a tendency that the positional deviation of the tip Q of the internal split from the one end P of the alcove opening 4 on the clamping die 2 becomes large. Such a situation is not preferable, because, in that case, not only it becomes difficult to adjust the length (or depth) of the internal splitting, but also it becomes easy to occur deformation of the workpiece metal plate 1 or to appear minute cracks at the tip of the internal split. In addition, when the pressure of the press-splitting is too low, or when the speed of the press-splitting is too slow, the performance of the internal splitting is not enough, causing a large positional deviation from the end of the clamping die 2. Further, in that case, a problem of lowered working efficiency arises in the internal splitting operation. Therefore, in the present invention, it is required to perform the internal splitting with the condition for optimized pressure and speed so that the positional deviation of the tip Q of the internal split from the one end part P of the alcove opening 4 provided on the clamping die 2 is small. That is, the optimization of the processing conditions for the press-splitting that is performed by the invented method for internal splitting in the cross-section of the end of a material becomes eventually practicable by regulating the position of the end of the clamping die 2 that pinches the metal plate 1 to be the same position as the tip of the intended internal split. In this embodiment, the press-splitting is performed at the setting: 1 to 10 tons of pressing load and 1 to 50 m/s of press-loading speed. More preferable ranges of them are 2 to 5 tons for the pressing load and 2 to 20 m/s for the press-loading speed, when the balance of the performance and cost of the pressing device is taken into consideration.

In the process shown in FIGS. 1B and 1C, the clamping die 2 is moved to the internal slitting intended position with the metal plate 1 supported. In this embodiment, the clamping dies 2 arranged on both sides of the metal plate 1 are moved usually simultaneously. The moving distance may be same as the one in the process shown in FIG. 1A, or instead, different distance can be applicable. In this regard, the conditions of the press-splitting by the splitting punch 3 in terms of the pressing load and the press-loading speed particularly does not need change, because the conditions of the press-splitting have certain allowance. However, when the change in the moving distance is large or when optimization of the press-splitting conditions is required, the press-splitting conditions may be changed. The clamping die 2 is fixed again pinching tightly the metal plate 1 after being moved over the predetermined distance. In the process shown in FIGS. 1A to 1C, the preferable range of the moving distance of the clamping die 2 for every one processing step is 0.01 to 10 mm; more preferable one is 0.5 to 5 mm The moving distance less than 0.01 mm is not preferable because the internal slitting consumes much time causing greatly reduced work efficiency. When the moving distance is more than 10 mm, such a situation brings about problems of not only increased deformation of the workpiece metal material, but also breakage or severe abrasion of the punch blade tip. In the present invention, the moving distance of the clamping die 2 within the range of 0.5 to 5 mm hardly brings about a problem like that.

After the process shown in FIG. 1A, the internal splitting is performed to the predetermined length (or to the depth) by repeating the press-splitting processes shown in FIGS. 1B and 1C. In the repetition of the process shown in FIGS. 1B and 1C the moving distance of the clamping die 2 may be constant, or instead, may be changed at each time of the processing. For example, the moving distance of the clamping die 2 at the final operation may be made shorter than those distance applied to the previous moving for performing a highly accurate internal splitting in accordance with the design value. Even when a need arises to change the press-splitting conditions with the change in the internal splitting distance, grasping in advance the relationship between the internal splitting length and the press-splitting conditions allows a continuous automatic control by a control device such as a computer on the moving and clamping-and-hold action of the clamping die 2, the conditions of the press-splitting, etc. This automatic control method is applied to an end-splitting method that is continuously performed in one direction at a predetermined stroke, or, to an end-splitting method by a progressive transfer system. The progressive transfer system employed in the end-splitting method is configured by separating the press-splitting process into sub-processes individually and arraying them in series; thereby multiple press-splitting processes are performed continuously. In the present invention, the repetition of the press-splitting shown in FIGS. 1B and 1C may be carried out not only in a manner such that the repetition is performed by one processing device only or performed in a series of processes, but also by a method that performs the repetition in a multiple-processing carrying out individually as independent processes. Even in the later case, the automatic control of the moving of the clamping die and the press-splitting conditions is usable as a production control tool.

[The Second Embodiment]

Figures 2A, 2B, 2C, 2D:
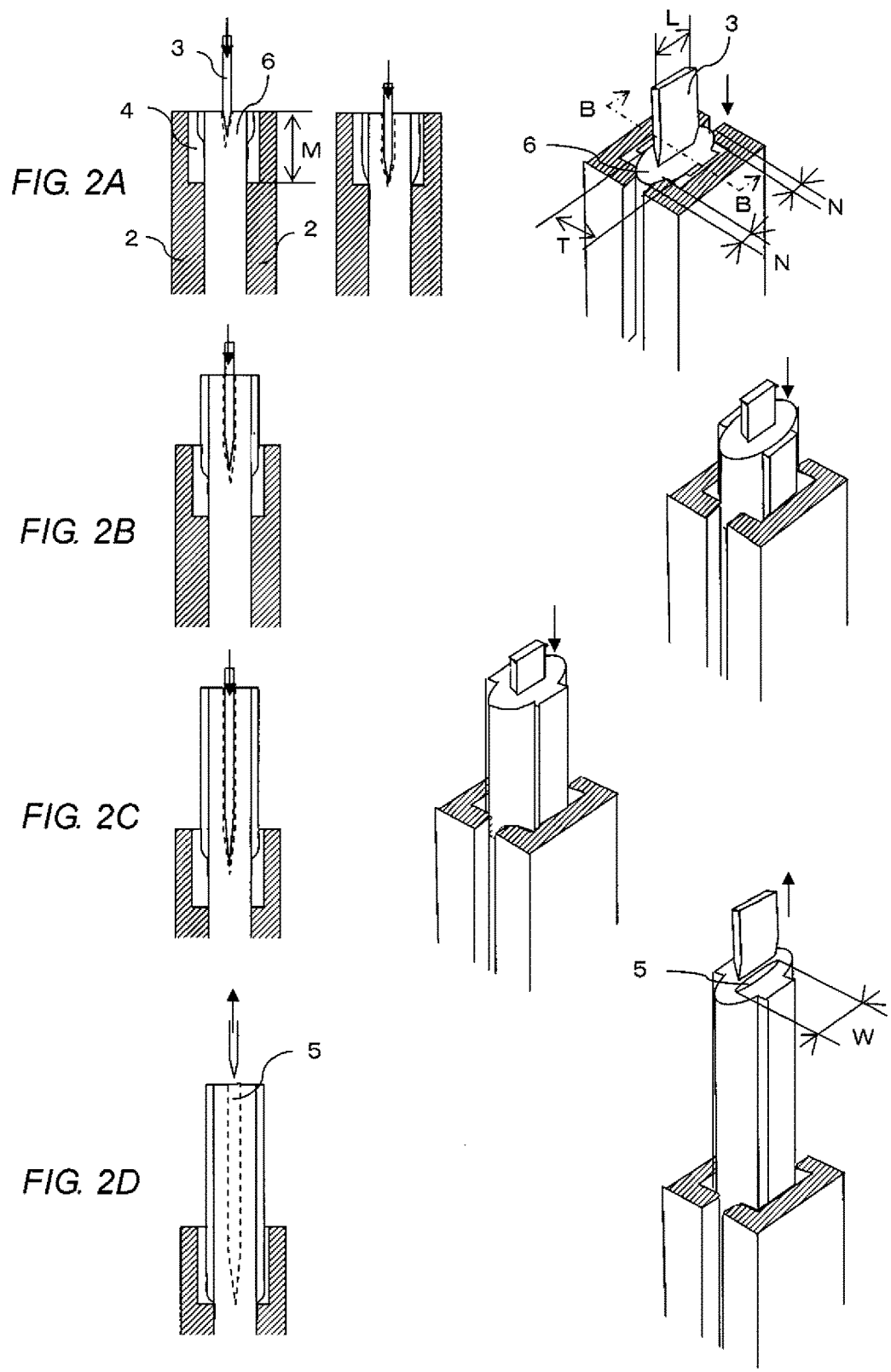
FIGS. 2A to 2D are explanatory drawings of the process performed by the method for internal splitting in the cross-section of the end of a metal rod in the second embodiment of the present invention.

FIGS. 2A to 2D are explanatory drawings of the process performed by the method for internal splitting in the cross-section of the end of a metal rod 6 in the second embodiment of the present invention, wherein the press-splitting using a splitting punch 3 is performed moving a clamping die 2. In FIGS. 2A to 2D, the illustration on the left side thereof shows a cross-sectional view of the perspective view on the right side thereof sectioned along the line B-B. The process shown in FIGS. 2A to 2D is comprised of the basically same processes as those shown in FIGS. 1A to 1D except that the kind of the metal workpiece is the metal rod 6 instead of a metal plate. That is, the end splitting method of this embodiment comprises the steps of:

(a) Clamping at least four places on the metal rod 6 in opposed positions on both sides of its periphery with the clamping die 2, abutting the splitting punch 3 on the cross-section of the end of the metal rod 6 to begin the press-splitting, and performing the press-splitting to the intended internal split depth M of an alcove opening 4 provided on the clamping die 2 (refer to 2A);

(b) Moving the clamping die 2 to the intended internal split position, then clamping the metal rod 6 by pinching with the clamping die 2, and performing again the press-splitting (refer to FIG. 2B);

(c) Repeating the press-splitting with the splitting pinch 3 to advance the internal splitting to the desired depth (refer to 2C); and (d) Moving the splitting punch 3 toward the arrow-indicated direction (an upward arrow) and taking out the metal rod 6 on which an internal split 5 is formed (refer to FIG. 2D).

In securing the metal rod 6 with the clamping die 2 in this embodiment, the place to be pinched by the clamping die 2 requires at least four places in opposed positions, because the area of width W that corresponds to the internal split must be exempted from the pinching. The depth of the internal splitting can be determined at the process steps (b) and (c) stated above. Eventually, the metal rod 6 comes to have an internal split in the cross-section, which is as shown in FIG. 2D. After that, a subsequent processing such as press-forming, swaging, or pressure-forming is performed to manufacture metal components having shapes like such as metal containers or metal pipes for example.

In the process shown in FIG. 2A to 2D, the blade length L of the slitting punch 3 and the length N of a clamping margin on the clamping die 2 are set in the basically same manner as described in the first embodiment. Here, the diameter of the metal rod 6 used as the metal workpiece in this embodiment is expressed as T. Further, the internal splitting depth from the end of the metal rod 6 is determined by moving the clamping die 2 in a manner basically same as with the first embodiment.

[The Third Embodiment]

FIGS. 3A to 3D are explanatory drawings of the process performed by the method for internal splitting in the cross-section of the end of a metal plate 1 in the third embodiment of the present invention, wherein a hole or slot 7 is formed on both ends of an intended internal split and then the press-splitting is performed with a splitting punch moving a clamping die 2. In FIGS. 3A to 3D, the illustrations on the left side thereof show cross-sectional views of the perspective views on the right side thereof sectioned along the line C-C. The process shown in FIGS. 3A to 3D is comprised of the basically same processes as those shown in FIGS. 1A to 1D except that the hole or slot 7 is formed on both ends of the intended internal split on the cross-section of the end of the metal plate 1. That is, the internal splitting method of this embodiment comprises the steps of:

(a) Forming the hole or slot 7 on both ends of the region that corresponds to the width W of the intended internal split in the cross-section of the end of the metal plate 1 to the intended internal split depth (refer to FIG. 3A);

(b) Clamping both sides of the metal plate 1 by pinching with the clamping die 2, abutting a splitting punch 3 on the cross-section of the end of the metal plate 1, and performing the press-splitting to the intended internal split depth M of an alcove opening 4 provided on the clamping die 2 (refer to FIG. 3B);

(c) Moving the clamping die 2 to the intended internal split position, then clamping the metal plate 1 by pinching with the clamping die 2, and performing again the press-splitting (refer to FIG. 3C); and (d) Repeating the press- splitting with the slitting punch 3 to advance the internal splitting to the desired depth (refer to FIG. 3D).

Although FIGS. 3A to 3D do not show, this embodiment includes the process in which the splitting punch 3 is moved to the outside of the metal plate 1 from the inside thereof after the process step (d) stated above. The depth of the internal splitting can be determined at the process step (c) and (d) stated above. As shown in the cross-sectional view in FIG. 3D, the metal plate 1 eventually comes to have an internal split the cross-section of which reaches the tip of the alcove opening 4 provided on the clamping die 2.

In FIG. 3D, the width W of the region corresponding to the intended internal split can be formed in an approximately same dimension as the distance between holes or slots 7 formed on both ends of the intended internal split. In doing so, the hole or slot 7 can be formed using a drill, a punch, a laser beam, or other similar tools. Drilling is suitable for forming the hole or slot 7 deep. It is appropriate to use the splitting punch 3 having a blade length equal to or little bit shorter than the width W. To be more concrete, the splitting punch 3 is a splitting punch that has a blade length in the range of 1×W to 0.8×W. This embodiment permits the width W to be designed with higher accuracy compared to the internal splitting method described in the embodiment shown in FIGS. 1A to 1D, because the width W of the intended internal split can be determined in advance.

In this embodiment, another one or two or more holes or slots may be formed on the line connecting the holes or the slots 7 on both ends of the intended internal split. In this case, the diameter of such another holes or slots may be same as or different from the hole or slot 7 first formed on both ends of the intended internal split. For forming an even and smooth internal split face, it is practical manner to make the diameter of such additional holes or slots be same as or smaller than that of the hole or slot 7. By doing so, the intended part for the internal split is subdivided, and consequently the internal splitting resistance at the time of the press-splitting by the splitting punch lowers with a smooth press-splitting.

This embodiment may be implemented in combination with the means used in the first embodiment, as explained above, that is, the means used for the splitting punch having a blade length of 0.8×W to 1.1×W in terms of the intended internal split width W may be jointly used in this embodiment. For example, first, the hole (bore) or slot 7 is formed on both ends of the width W of the intended internal split to the depth defined in the first embodiment as the length (or the depth) of the intended internal split, and the press-splitting is performed using the splitting punch or the cleaving punch. Thereafter, the punching tool is replaced with the splitting punch or the cleaving punch having a blade length of 0.8×W to 1.1×W in terms of the intended internal split width W and the internal splitting is repeated to proceed further. Since the intended internal split width W is regulated in advance by the distance between holes or slots 7 formed at the initial step of the process, the internal split can be formed having the width W accurately even when the successive process is to use the splitting punch having a blade length of 0.8×W to 1.1×W.

In the process shown in FIGS. 3A to 3D, the length N of the clamping margin of the clamping die 2 is set in the basically same manner as in the first embodiment. Further, the internal splitting depth from the cross-section of the end of the metal plate 1 can be determined by performing the moving of the clamping die 2 in the basically same manner as in the first embodiment. After the processing shown in FIG. 3D and the pulling out of the splitting punch 3, the metal plate 1 thus given the internal split undergoes subsequent process such as press-forming, swaging, and pressure-forming. Thereby the metal plate 1 is manufactured into metal components, shapes of which are containers or pipes for example.

[The Fourth Embodiment]

Figure 4A:
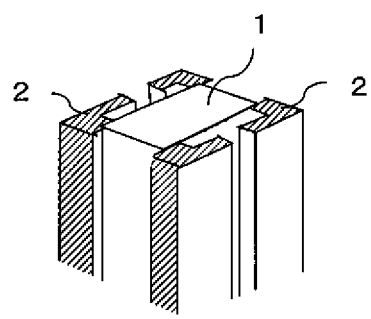
FIGS. 4A to 4C are drawings to show another form of the clamping die used in the first to the third embodiments of the present invention.
Figure 4B:
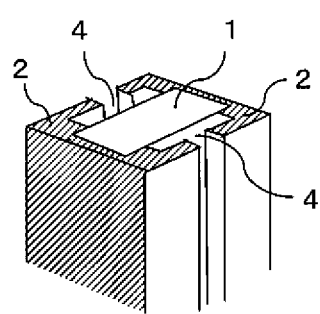
Figure 4C:
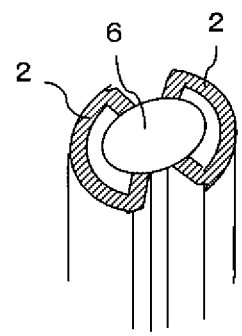

FIGS. 4A to 4C are drawings to show another form of the clamping die used in the first to the third embodiments of the present invention. The first to the third embodiments use two elements of clamping dies. The present invention permits use of four elements of clamping dies for pinching the metal plate to secure as shown in FIG. 4A. In addition, a structure that pinches all the circumference of a metal plate 1 except the part at an alcove opening 4 may be employed for enhanced securing as shown in FIG. 4B. As a clamping die 2 for pinching a metal rod 6 to secure, an article having parts that pinch the metal rod 6 at four opposed positions on its circumference may be used as shown in FIG. 4C, instead of the clamping die 2 shown in FIGS. 2A to 2D.

In the clamping die 2 shown in FIGS. 4A to 4C, the length of the clamping margin that pinches the metal plate 1 or the metal rod 6 is required to be 0.1×T or more, preferably 0.3×T or more, except the region that corresponds to the intended internal split, where the thickness of the metal plate 1 or the diameter of the metal rod 6 is expressed as T. As explained above, the reason for that is as follows. When the length of the clamping margin is less than 0.1×T, the metal plate 1 or the metal rod 6 are not secured enough; this causes a problem in that the positional deviation during the press-splitting and the wobbling of the abutting position occur.

[The Fifth Embodiment]

Figure 5A:
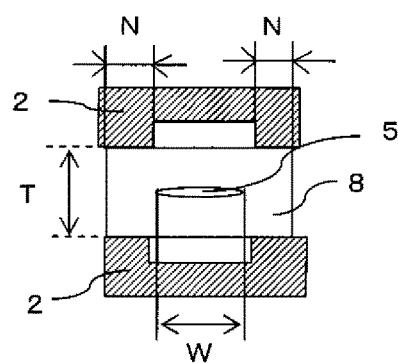
FIGS. 5A to 5F are explanatory drawings of another process performed by the method for internal splitting in the cross-section of the end of a metal plate or a metal rod in the fifth embodiment of the present invention.
Figure 5B:
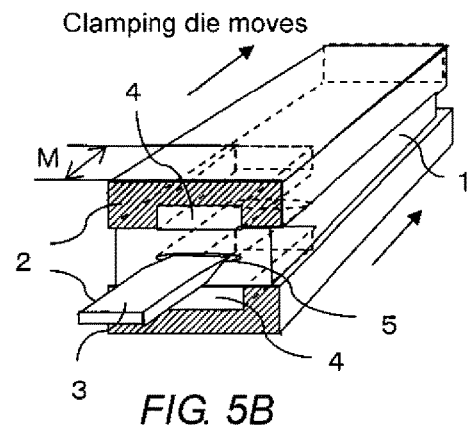
Figure 5C:
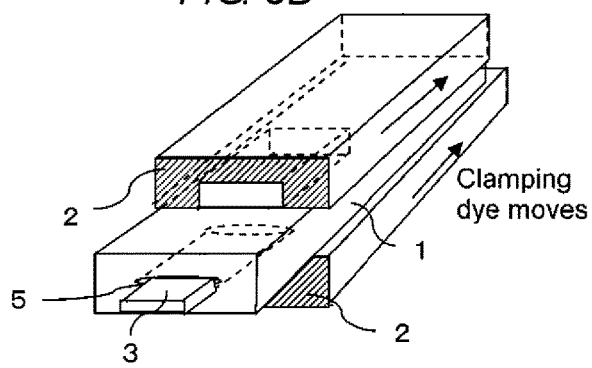
Figure 5D:
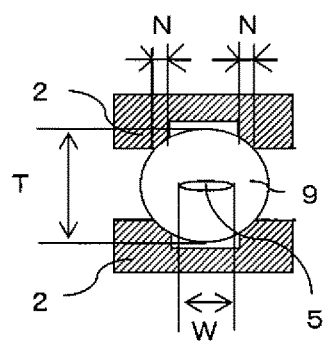
Figure 5E:
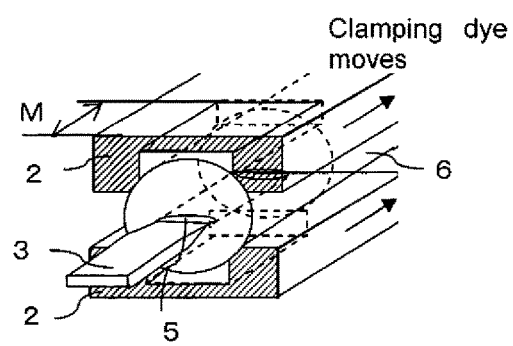
Figure 5F:
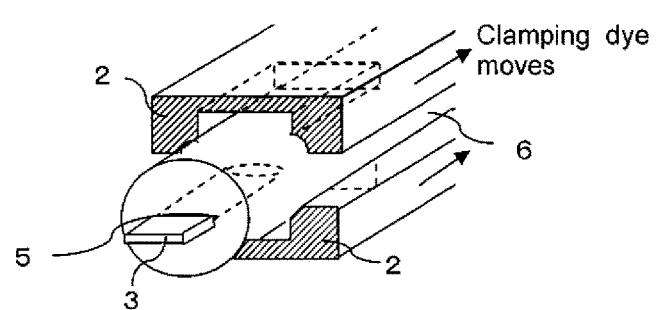

FIGS. 5A to 5F are explanatory drawings of another process performed by the method for internal splitting in the cross-section of the end of a metal plate 1 and a metal rod 6 in the fifth embodiment of the present invention, wherein the press-slitting using a splitting punch 3 is performed moving a clamping die 2. FIG. 5A shows a cross-section 8 of the end of the metal plate that has an internal split, and FIGS. 5B and 5C show a part of the process of an internal splitting method. FIG. 5D shows a cross-section 9 of the end of the metal rod that has an internal split, and FIGS. 5E and 5F show a part of the process of an internal-splitting method. The process of the internal splitting method shown in FIGS. 5A to 5F is different from the processes shown in FIGS. 1A to 1E and FIGS. 2A to 2D in that the internal splitting of the metal plate 1 and the metal rod 6 is performed in the horizontal direction, i.e., parallel to the ground. For example, when lengthening (or deepening) an internal slit 5 is desired, not only the space required for the processing can be relatively narrowed, but also the securing of the workpiece of the metal plate 1 or the metal rod 6 and the moving of the clamping die 2 become easy. Because of this, the internal splitting uses the process shown in FIGS. 5A to 5F in some cases.

As shown in FIGS. 5A and 5B, the length N of a clamping margin of the clamping die 2, the clamping margin abutting on the metal plate 1 or the metal rod 6, is required to be 0.1×T or more, preferably 0.3×T or more as with the first to the third embodiments, where the thickness of the metal plate 1 or the diameter of the metal rod 6 is expressed as T. In this case, the clamping die 2 is provided on each of both sides of the metal plate 1 or the metal rod 6 except such an area as corresponds to the intended internal split namely the width W.

In the method for internal splitting in this embodiment, the method for moving the clamping die 2 is basically same as the first to the third embodiments. First, the metal plate 1 or the metal rod 6 is pinched and secured by the clamping die 2 at its portion at least four opposed positions on the periphery of both sides thereof; the splitting punch 3 is then abutted on the cross-sections 8 and 9 of the respective end of the metal plate 1 or the metal rod 6; and the press-splitting is performed to the intended internal split depth M that corresponds to the position of the tip of an alcove opening 4 provided on the clamping die 2 (refer to FIGS. 5B and 5E). Then the clamping die 2 is moved to the intended internal split position and the metal plate 1 or the metal rod 6 is pinched and secured by the clamping die 2; and then the press-slitting is again performed. The press-splitting with the splitting pinch 3 is repeated to advance the internal splitting to the desired length (or depth) of the internal split 5 (refer to FIG. 5C and 5F). Thus, the metal plate 1 or the metal rod 6 is given the internal split 5 having the desired length (or depth). Although not shown in FIGS. 5A to 5F, the process in this embodiment includes the process for pulling out the splitting punch 3 from the metal plate 1 or the metal rod 6 on completion of the press-splitting.

[The Sixth Embodiment]

Figure 6A:
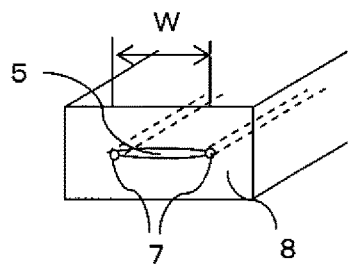
FIGS. 6A to 6D are explanatory drawings of the process performed by the method for internal splitting in the cross-section of the end of a metal plate and a metal rod in the sixth embodiment of the present invention.
Figure 6B:
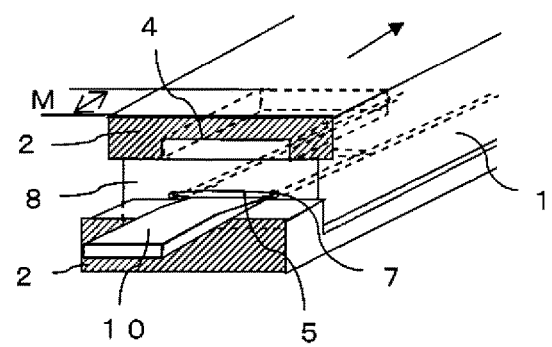
Figure 6C:
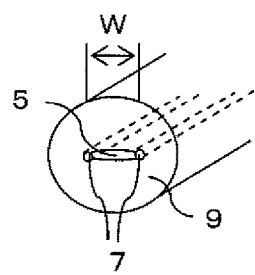
Figure 6D:
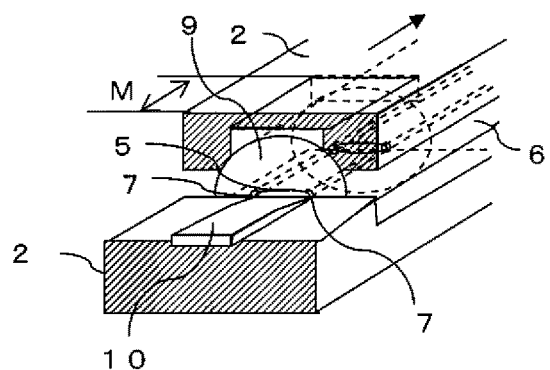

FIGS. 6A to 6D are explanatory drawings of the process performed by the method for internal splitting in the cross-section of the end of a metal plate 1 and a metal rod 6 in the sixth embodiment of the present invention, wherein the press-splitting is performed by a cleaving punch 10 moving a clamping die. FIGS. 6 and 6B are perspective views of a state of the metal plate and the metal rod, in which an internal split 5 is formed inside cross-sections 8 and 9 of the respective end of them after forming holes or slots 7 on both ends of the intended internal split thereon. FIGS. 6B to 6D are perspective views of a state, in which the cleaving punch 10 is abutted on each of the cross-sections 8 and 9 of the respective end of the metal plate and the metal rod. The process in the method for internal splitting shown in FIGS. 6A to 6D differ from the method shown in FIGS. 5A to 5F in that: the hole or slot 7 is formed on both ends of the internal split 5, the cleaving punch 10 is used instead of a splitting punch 3, and a clamping die 2 is moved in another manner.

In this embodiment, using the cleaving punch 10 includes a feature such that: not only the clamping die 2 has a structural difference between its upper and lower elements but also both the setting positions of them in moving at the time of the press-splitting are different. The upper element of the clamping die 2, the element having an alcove opening 4, is moved so that the one end of the alcove opening 4 changes its position from the cross-sections 8 and 9 of the respective end of the metal plate or metal rod to the place same as the position of the tip of the internal split at each time of the press-splitting operation by the cleaving punch 10. On the other hand, the lower element, which does not have the alcove opening, is arranged so that the metal plate 1 or the metal rod 6 is held at the same position as the ends of them.

The cleaving punch 10 shown in FIGS. 6B to 6D has a flat bottom face. The internal splitting is advanced by moving the cleaving punch 10 being abutted on the bottom plane of the lower element of the clamping die 2. The width W of the internal split can be set as designed being regulated by the hole or slot 7 formed. As described, the bottom face of the cleaving punch 10 is supported by the lower element of the clamping die 2. Therefore, an easily-occurring problem of the positional deviation of the punch at the time of the press-splitting can be greatly reduced. Thus, this method is suitable for internal splitting in the cross-section of the end of a thin metal plate and a small-diameter metal rod or forming multiple internal splits in a parallel formation in the cross-section of the end of such a workpiece.

FIGS. 6A to 6D show the internal splitting method that performs internal splitting with the hole or slot 7 being formed on both ends of the internal split. In this embodiment however, an internal split of desired width W can be formed without forming the hole or slot 7, by using the cleaving punch 10 having a blade length of 0.8×W to 1.1×W.

[The Seventh Embodiment]

Figure 7A:
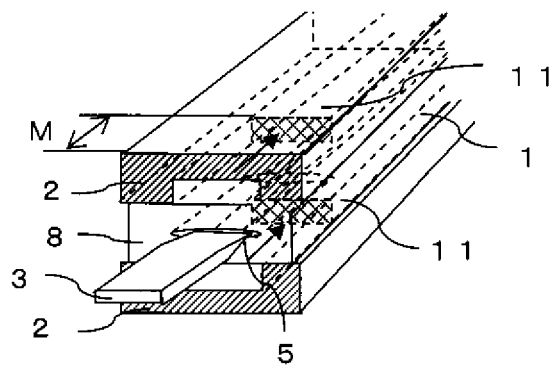
FIGS. 7A to 7C are explanatory drawings of the process performed by the method for internal splitting in the cross-section of the end of a metal plate in the seventh embodiment of the present invention.
Figure 7B:
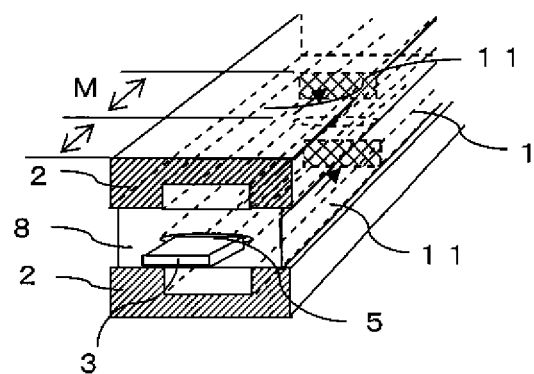
Figure 7C:
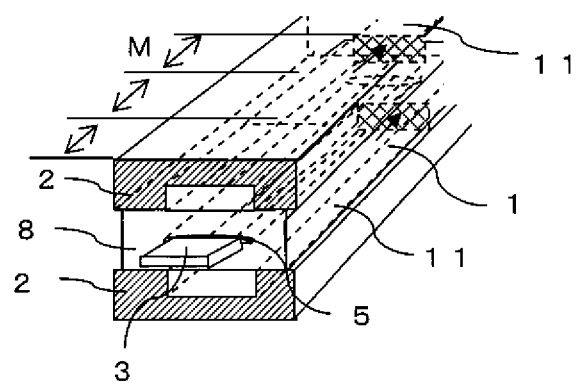

FIGS. 7A to 7C are explanatory drawings of the process performed by the method for internal splitting in a cross-section 8 of the end of a metal plate in the seventh embodiment of the present invention, wherein the press-splitting is performed with a splitting punch 3 using a clamping die having a sliding core die 11. The process shown in FIGS. 7A to 7C is a method that advances the internal splitting moving the sliding core die 11 inserted inside a clamping die 2 in accordance with the intended length (or depth) of an internal split 5 at each time of the press-splitting operation with both ends of a metal plate 1 pinched by a clamping margin of a clamping die 2.

As shown in FIGS. 7A to 7C, the internal splitting method of this embodiment comprises the steps of:

(a) Clamping both sides of a metal plate 1 by pinching with a clamping die 2, abutting a splitting punch 3 on the cross-section of the end of the metal plate to begin the press-splitting, sliding the sliding core die 11 inserted inside the clamping die 2 to the depth M of the intended internal split, and then performing the press-splitting to the intended internal split length M (or depth M) (refer to FIG. 7A);

(b) Sliding the sliding core die 11 toward the backside to the length (or depth) M and performing the press-splitting to the above-stated length (or depth) M with the splitting punch 3 (refer to FIG. 7B); and (c) Advancing the press-splitting with the splitting punch 3 to the length (or depth) M to continue the internal splitting as with the process in the item (b) above (refer to FIG. 7C).

In the process shown in FIGS. 7A to 7C, the length (or depth) of the intended internal split is 3M in total. When more elongation (or deepening) of the internal split is desired, the internal splitting can be extended to the desired length (or depth) by repeating the processes (b) and (c) above. On completion of the press-splitting, pulling out the splitting punch 3 out of the metal plate 1 finally obtains the metal plate 1 that is given an internal split having the desired length (or depth) from the cross-section 8 of the end thereof. As stated above, the depth of the internal split is determined by the processes (b) and (c). After that, on necessity, a subsequent processing such as press-forming, swaging, or pressure-forming is performed to manufacture metal components having shapes like such as metal containers or metal pipes for example.

In this embodiment, the sliding distance of the sliding core die 11 does not need to be the same for every press-splitting operation; varying the moving distance at each time of the operation may be practicable. Particularly, setting the sliding distance of the sliding core die 11 to successively shorter as the internal splitting length becomes longer (or deeper) makes not only the progress of the internal splitting smooth but also the internal split surface even and smooth.

Figure 8:
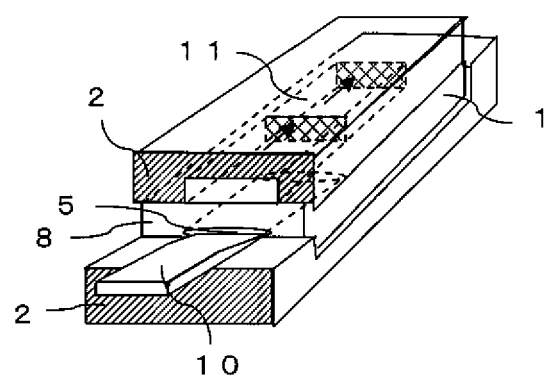
FIG. 8 is an explanatory drawing of another process performed by the method for internal splitting in the cross-section of the end of a metal plate in the seventh embodiment of the present invention.

In this embodiment, a cleaving punch 10 may be used for internal splitting to form the internal split 5 instead of use of the splitting pinch 3. FIG. 8 is an explanatory drawing of a process performed by the method for internal splitting in the cross-section 8 of the end of a metal plate in this embodiment, wherein the press-splitting is performed with the cleaving punch 10 using a clamping die having the sliding core die 11. The process shown in FIG. 8 is basically same as the process shown in FIGS. 7A to 7C except that the press-splitting uses the cleaving punch 10.

[The Eighth Embodiment]

Figure 9A:
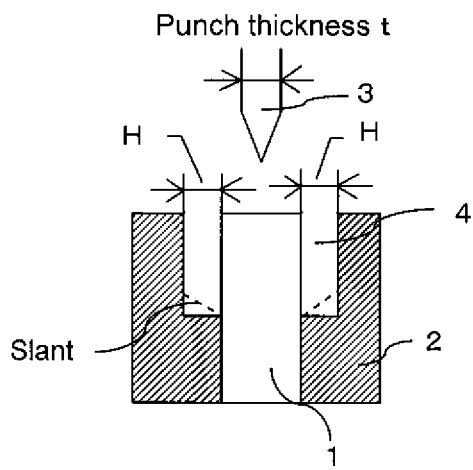
FIGS. 9A to 9D are cross-sectional views of the shapes of the alcove opening of a clamping die used in the eighth embodiment of the present invention.
Figure 9B:
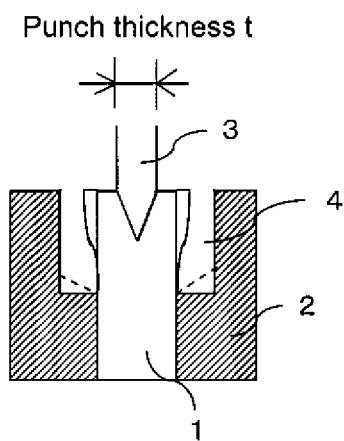

The present invention achieves its purpose by providing the first to the third features as explained previously. In addition, in a clamping die 2 having an alcove opening 4, it is preferable to regulate the height H of the alcove opening 4 on the clamping die 2, the height H being perpendicular to the width W of the internal split. FIGS. 9A to 9D show cross-sectional views of the shapes of the alcove opening 4 of the clamping die used in the present invention. FIGS. 9A to 9D are enlarged cross-sectional views of the alcove opening 4 of the clamping die 2 shown in the illustration on the left side part of FIGS. 1A to 1D. FIG. 9A shows the state before a splitting punch 3 is abutted. FIG. 9B shows the shape of the internal split that will be observed in the middle of the press-splitting process after the abutting of the splitting punch 3.

In this embodiment, a preferable height H of the alcove opening 4 is 0.2×t to 0.8×t in terms of the thickness t of the splitting punch 3. If the height of the alcove opening is less than 0.2×t, the clearance for the deformed metal produced from the internal splitting in the press-splitting process reduces. This prevented the splitting punch from entering the intended internal split, and the internal splitting did not proceed. If the height of the alcove opening is more than 0.8×t, the clamping of the workpiece of a metal plate 1 becomes not enough, preventing the splitting punch 3 from entering straight. This unfavorable state brought about a problem such that the internal split face lost its even smoothness or the continuous progress of the multiple-times pressing process was interrupted due to fluctuation of the abutting position of the punch occurring in the middle of the press-splitting process. As stated above, the height H of the alcove opening 4 is regulated in accordance with the thickness t of the splitting punch 3 for straight and smooth insertion and entering of the splitting punch into the intended internal split. This is considered that the thickness t of the slitting punch 3 has an effect not only over the clearance for the deformed metal produced from internal splitting but also over the effectiveness of clamping a metal plate 1 greatly as with the influence of the length N of the clamping margin of the clamping die 2.

Figure 9C:
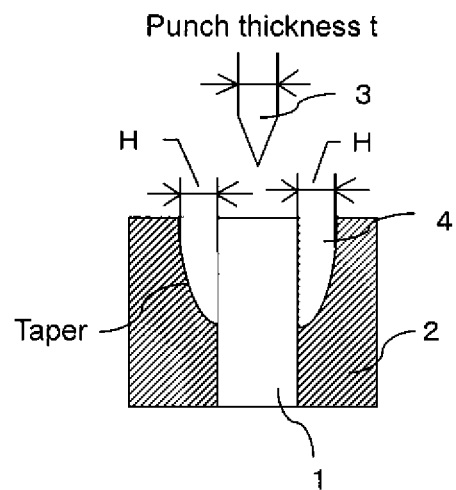
Figure 9D:
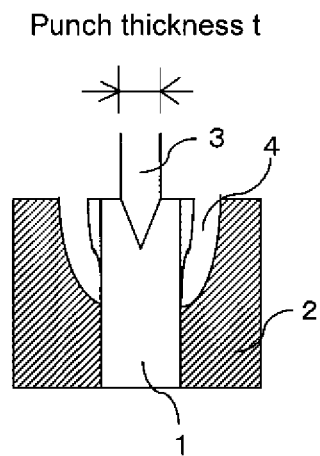

In the present invention, the shape of the alcove opening of the clamping die 2 may be rectangular; however, the alcove opening 4 having a slant-tip as shown in FIGS. 9A and 9B with dotted lines may be also practicable. In addition, it is more preferable that the height of the alcove opening has a tapered shape as shown in FIGS. 9C and 9D, wherein the height of the alcove opening becomes gradually lower from the cross-section of the end of the metal plate 1 toward the tip of the intended internal split. Since the tapered alcove opening has a shape such that the thickness of the clamping die becomes thicker as it nears to the clamping position where the metal plate 1 is pinched, the positional deviation of the metal plate 1 and the irregularity in positioning of the abutting of the splitting punch 3 are greatly reduced. FIGS. 9A to 9D show examples of a method for internal splitting in the cross-section of the end of the metal plate 1 with the splitting punch 3. In this embodiment, a metal rod may be used as the workpiece metal material and a cleaving punch as the punch for the press-splitting as well.

[The Ninth Embodiment]

Figure 10A:
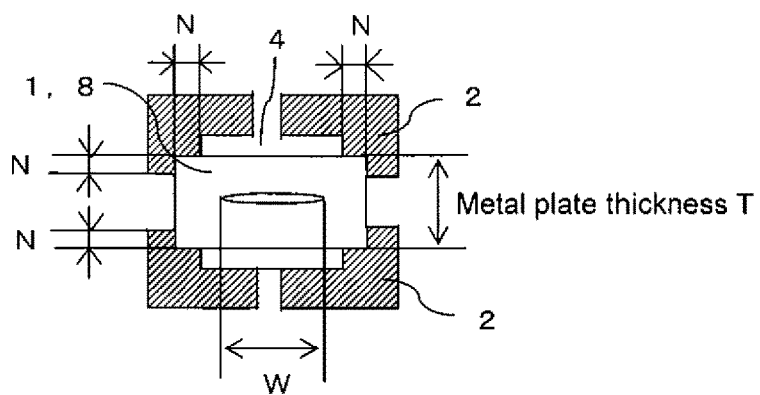
FIGS. 10A and 10B are drawings to show a state in which the metal plate or the metal rod is secured by the clamping die of another form in the method for internal splitting in the cross-section of the end of a metal plate or a metal rod in the ninth embodiment of the present invention.
Figure 10B:
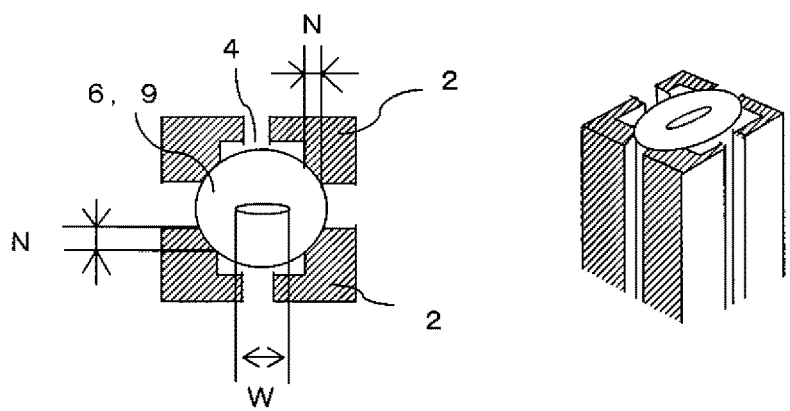

FIGS. 10A and 10B are drawings to show a state in which a metal plate 1 or a metal rod 6 is secured by a clamping die 2 of another form in the method for internal splitting in cross-sections 8 and 9 of the respective end of a metal plate or a metal rod in this embodiment. FIG. 10A shows the construction of the clamping die 2 that has an alcove opening 4 for pinching and clamping the metal plate 1, wherein the clamping die 2 has a clamping margin not only in the horizontal direction but also in the vertical direction with respect to the metal plate 1. In this construction, the length N of the clamping margin that abuts on each side of both sides of the metal plate 1 except such an area corresponding to the intended internal split is 0.1×T or more, where the thickness of the metal plate 1 is expressed as T. FIG. 10B shows the construction of the clamping die 2 when the metal rod 6 having a diameter T is used for the internal splitting. The internal split is formed in the cross-section 8 of the end of the metal plate 1 or in the cross-section 9 of the end of the metal rod 6 as shown in FIGS. 10A and 10B.

In the construction of the clamping die 2 shown in FIGS. 10A and 10B, the vertical part of the metal plate 1 or the metal rod 6 is clamped by the clamping margin having a length of 0.1T or more, and an opening is formed over an area including such a part as corresponds to the height of the internal split. Therefore, not only the clamping of the metal plate 1 or the metal rod 6 is ensured but also a vertical-direction resistance that appear in the press-splitting for the internal split can be reduced. Thereby, an advantage that the internal splitting can be performed at a high speed with a smaller pressing pressure compared to those in the methods shown in FIGS. 1A to 4C is brought.

[The 10th Embodiment]

Figures 11A, 11B, 11C:
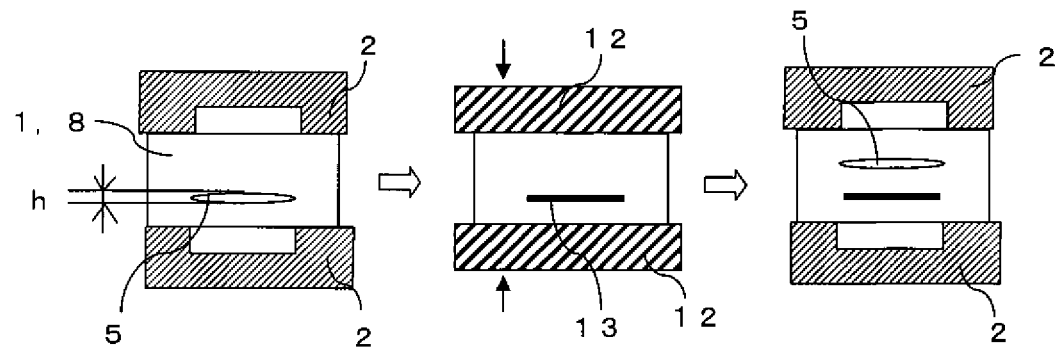
FIGS. 11A to 11F are explanatory drawings of the process to perform forming a plurality of internal splits by the method for internal splitting in the cross-section of the end of a metal plate or a metal rod in the 10th embodiment of the present invention.
Figures 11D, 11E, 11F:
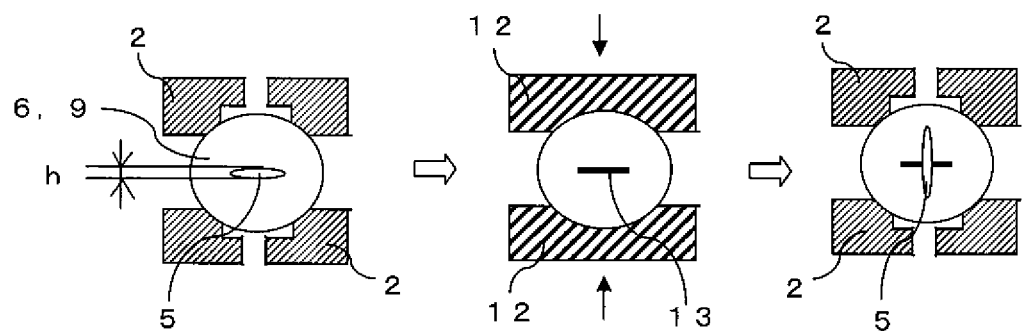

The present invention permits forming the multiple internal splits in the cross-section of the end of each of a metal plate and a metal rod. FIGS. 11A to 11F are explanatory drawings of the process to perform forming a plurality of internal split in a cross-section 8 at the end of a metal plate or in a cross-section 9 at the end of a metal rod. FIGS. 11A to 11C show the process where the workpiece metal material is a metal plate 1 and FIGS. 11D to 11F show the process where the one is a metal rod 6.

For a metal plate 1, the process includes the steps of:
(a) Forming the first internal split 5 in the cross-section 8 of the end of the metal plate (refer to FIGS. 11A);
(b) Pressing a crevice 13 of the first internal split using a swaging press die 12 to close the crevice 13 (refer to 11B); and
(c) Forming the second internal split 5 in the cross-section 8 of the end of the metal plate 1 in parallel to for example the first internal split.

FIGS. 11A to 11C do not show concretely the process for controlling the length (or depth) of the internal split by repeating the press-splitting with the splitting punch or the cleaving punch. For example however, the length (or depth) of the internal split can be determined by performing the same processing as those shown in FIGS. 1B and 1C or the same operation as the one shown in FIG. 6B.

For the metal rod 6, the process uses a clamping die 2 having the same construction as shown in FIG. 10B and includes the steps of:

(d) Forming the first internal split 5 in the cross-section 9 of the end of the metal rod (refer to FIG. 11D);

(e) Pressing a crevice 13 of the first internal split 5 using a swaging press die 12 to close the crevice 13 (refer to FIG. 11E); and (f) Forming the second internal split 5 in the cross-section 9 of the end of the metal rod in a manner perpendicular to for example the first internal split 5 (refer to FIG. 11F).

The length (or depth) of the internal split can be determined by repeatedly performing the processes shown in FIGS. 2B and 2C to the desired length (or depth).

In the process shown in FIGS. 11A to 11F, when the vertical length h of the first internal split is small, the pressing process shown in FIG. 11B or 11E for closing the crevice 13 may be omitted.

Figures 12A, 12B, 12C:
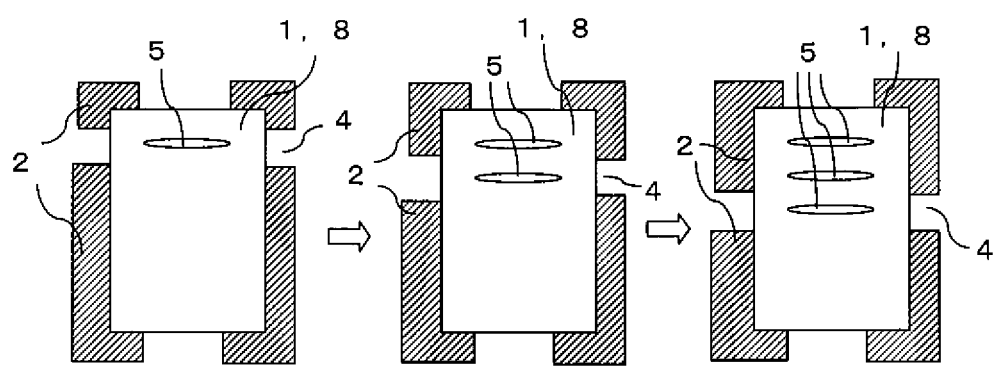
FIGS. 12A to 12C are explanatory drawings of another process performed by the method for internal splitting in the cross-section of the end of a metal plate in the 10th embodiment of the present invention.

FIGS. 12A to 12C are explanatory drawings of the process to perform forming a plurality of internal splits in the cross-section 1 or 8 at the end of a metal plate. The process shown in FIGS. 12A to 12C uses a clamping die having a modified alcove opening, whose vertical shape is modified based on the construction of the clamping die 2 shown in FIG. 10A. In the process shown in FIGS. 12A to 12C, the first, the second, and the third internal splits 5 are successively formed in the cross-section 1 or 8 of the end of the metal plate, following the process steps (a), (b), and (c) shown therein repeating the process shown in FIG. 5C. The clamping die 2, after the forming of the first internal split 5 by the press-splitting finishes at the stage shown in FIG. 12A, is arranged in place orderly changing the vertical position of an alcove opening 4 in accordance with the vertical-wise location in the cross-section 1 or 8 of the end of the metal plate where the second internal split 5 is to be formed. For forming the third internal split 5, the same process is performed. If needed, the same processing is repeated for forming the internal split of the fourth and after.

FIGS. 12A to 12C show a method in which the processes (a), (b), and (c) are performed continuously. In this embodiment however, a process for closing the crevice 13 of the internal split 5, which is formed at each process stage by the same method as shown in FIG. 11B, using the swaging press die 12 may be inserted between each process stage. The process for closing the crevice 13 of the internal split 5 is suitable for the case where a plurality of the internal splits are to be formed in a thin metal plate or where the spacing between each internal split is required to be narrow.

Figure 13A:
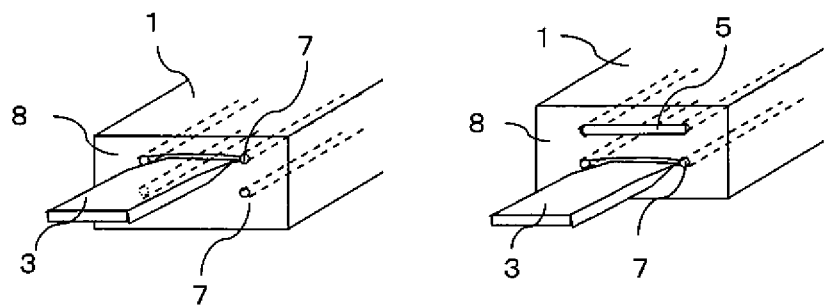
FIGS. 13A and 13B are explanatory drawings of the process of forming a hole or slot on both ends of the intended internal split to form a plurality of internal splits in the method for internal splitting in the cross-section of the end of a metal plate or a metal rod in the 10th embodiment of the present invention.
Figure 13B:
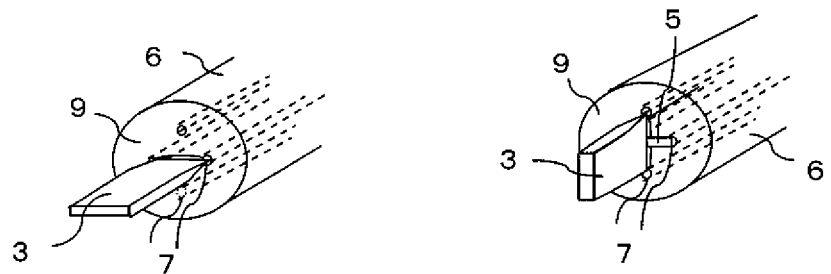

FIGS. 13A and 13B are explanatory drawings of the process of forming a plurality of the internal splits 5 in each of cross-sections 8 and 9 of the respective end of the metal plate 1 and the metal rod 6 after forming a hole or slot 7 on both ends of the intended internal split. FIGS. 13A and 13B are perspective view of the state in which a splitting punch 3 abuts on each of the cross-sections 8 and 9 of the respective end of the metal plate and the metal rod. FIG. 13A shows an example of process in which the internal splits 5 are formed parallelly each other, and FIG. 13B shows an example of process in which the internal splits 5 are formed perpendicularly to the other.

The internal splitting method shown in FIGS. 13A and 13B includes the steps of: forming the hole or slot 7 on both ends of each of the plurality of the intended internal splits; abutting the splitting punch 3 on each of the cross-sections 8 and 9 of the respective end of the metal plate and the metal rod, and repeatedly performing the press-splitting to advance the internal splitting; and abutting the splitting punch 3 on a place between the holes or slots 7 formed in another place in the cross-sections 8 and 9 of the respective end of the metal plate and the metal rod, and repeatedly performing the press-splitting to form the internal split 5. The process that advances the internal splitting is basically same as the processes stated in each of the embodiments described previously and is able to perform the press-splitting using a cleaving punch other than the splitting punch.

In the process shown in FIGS. 13A and 13B, as with the process shown in FIGS. 11B to 11E, a process for closing the crevice 13 of the finished internal split using the swaging press die 12 may be inserted between the process for the forming of the internal split and the one for the forming of another internal split in a place different from the previous internal split. The process for closing the crevice of the internal split 5 is suitable for the case where a plurality of the internal splits are to be formed in a thin metal plate or where the spacing between each internal split is required to be narrow. In addition, the forming of a cross-shaped internal split can be easily formed by the process shown in FIG. 13B.

[The 11th Embodiment]

The following explains a method for internal splitting in the cross-section of the end of a metal plate or a metal rod having an improved productivity in mass-production in the first to the 10th embodiments, wherein the improvement is given by a continuous press-splitting operation.

In each of the process shown in FIGS. 1A to 3D, the internal splitting in the cross-section of the end of a metal palate 1 or a metal rod 6 is performed after moving both sides or one side of a clamping die 2 unidirectionally at a predetermined stroke. Defining a series of these processes as one processing-cycle, the method in this embodiment repeats the cycle continuously and automatically to advance the internal splitting eventually to the predetermined length (or depth). In addition in this method, it may be practicable to perform the process (a) to (d) shown in FIGS. 1A to 3D continuously and unidirectionally, moving the metal plate 1 or the metal rod 6, which is the workpiece metal material, continuously and automatically at a predetermined stroke instead of moving the clamping die 2. In this case, the position of a splitting punch 3 or a cleaving punch 10 before the press-splitting is regulated in the predetermined place by a computer control using a position sensor. Likewise, both ends of or the one side of the clamping die 2 is automatically controlled to be moved in the predetermined position. In addition, as explained previously, when a need arises to change the press-slitting conditions with the change in the internal splitting distance, grasping in advance the relationship between the internal splitting length and the press-splitting conditions allows a continuous automatic control by a control device such as a computer on the moving and clamping-and-hold action of the clamping die 2, the conditions of the press-splitting, etc.

Figure 14A:
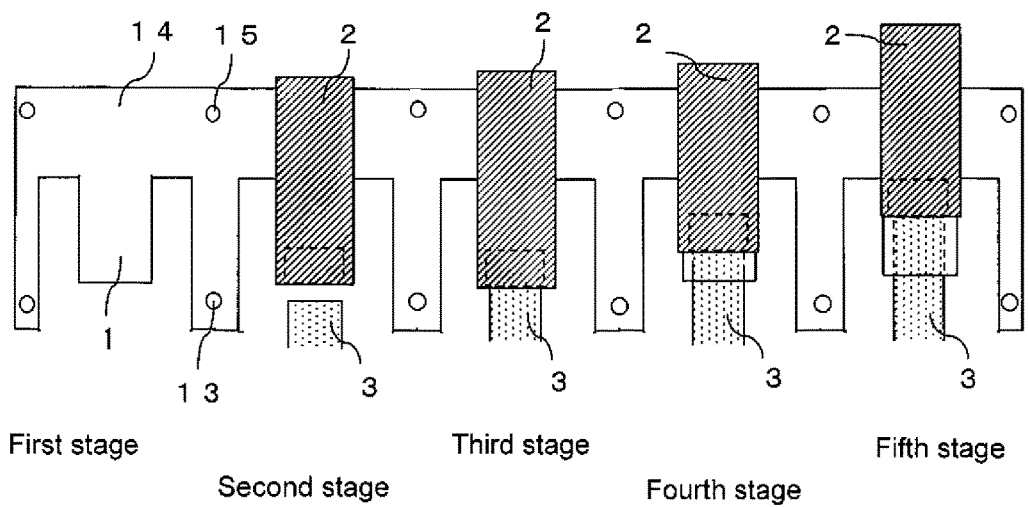
FIGS. 14A and 14B are explanatory drawings of the process of the method for internal splitting performed in a manner of a progressive transfer method in the 11th embodiment of the present invention.
Figure 14B:
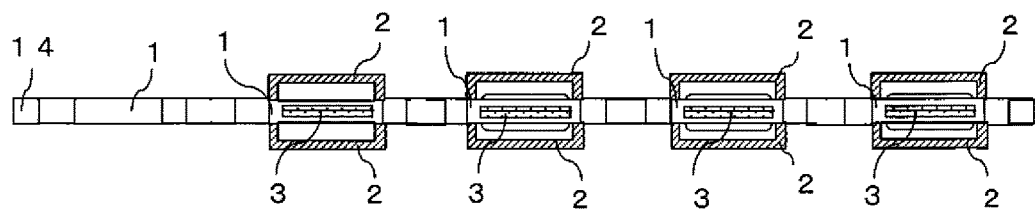
Figure 15A:
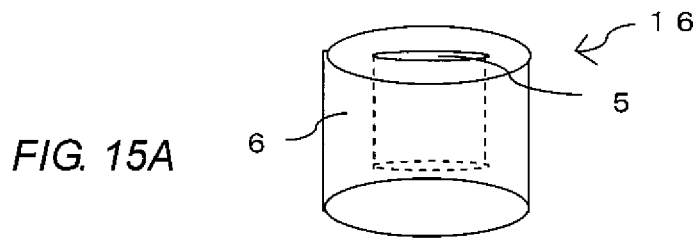
FIGS. 15A to 15E are explanatory drawings of the manufacturing process of a metal container manufactured by the 12th embodiment of the present invention.
Figure 15B:
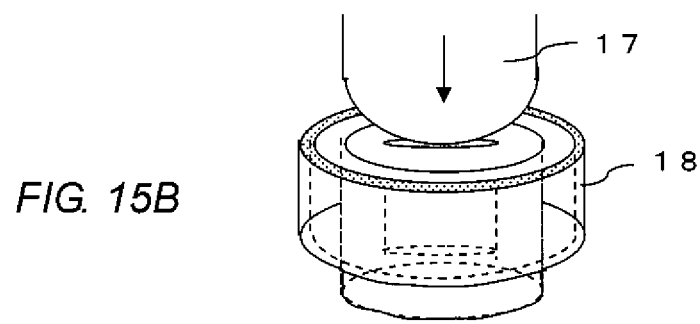
Figure 15C:
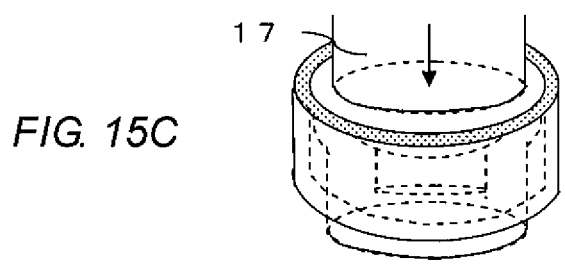
Figure 15D:
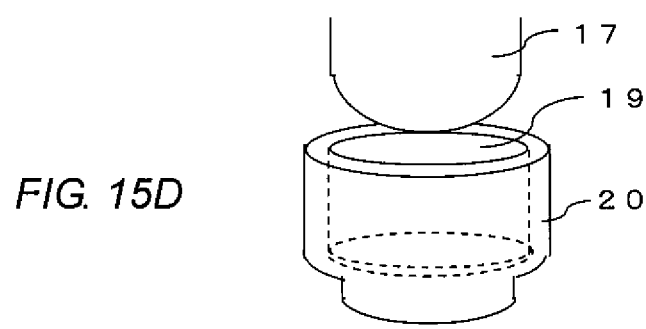
Figure 15E:
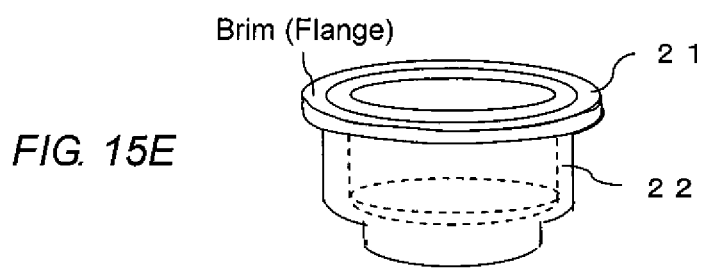

Another method for internal splitting by the continuous press-splitting includes a method for internal splitting in the cross-section of the end of a material by the progressive transfer method that is configured by separating the press-splitting process shown in FIGS. 1A to 3D into sub-processes individually, arraying them in series, and performing the multiple press-splitting processes continuously. The following explains processes of the end-splitting method by the progressive transfer method referring to FIGS. 14A and 14B. The end-splitting method shown in FIGS. 14A and 14B is an example of the press-splitting with the splitting punch 3. In the method for internal slitting in the cross-section of the end of the metal plate 1, FIGS. 14A and 14B are the plan view and the side view of the metal plate 1 respectively, wherein the side view is the one viewed from one end thereof.

As shown in FIGS. 14A and 14B, a long metal material 14 having a specified thickness is intermittently fed to the processing stages. At the first stage, the outside shape of the metal plate 1 is worked into a triangle. At the second stage, first, the metal plate 1 is clamped with the clamping die 2, and then, the first internal splitting is performed in the cross-section of the end of the metal plate 1 with the splitting punch 3. Following that, on and after the third stage, the clamping die 2 is moved to the next position to clamp again the metal plate 1, which is then followed by the press-splitting with the splitting punch 3 to advance the internal splitting. For convenience, FIGS. 14A and 14B show process to merely the fifth stage. In the present invention however, the number of the internal splitting stages on and after the fourth stage is variable, and the total number of the processing stages on and after the fourth stage and the length of the long metal material 14 are determined in accordance with the internal splitting distance per one press-splitting process and the intended final length of the internal split. Here, the length of the long metal material 14 depends on not only the number of workings of the press-splitting but also the external shape of the metal plate 1, method for processing, shapes of jigs, or other similar factors. Finally, the long metal material 14 is cut into pieces followed by subsequent process, or undergoes subsequent process before being cut into pieces.

As can be known from FIGS. 14A and 14B, when feeding the long metal material 14 intermittently, a die-pin is passed through a sprocket hole 15 to align the metal plate 1 and to prevent a rattle of the metal plate 1 during the press-splitting and other related working. At the first stage shown in FIGS. 14A and 14B, the metal plate 1 is worked to have a rectangular external shape; and then, at the second stage, the metal plate undergoes vertical bending, which is followed by the first internal splitting thereon at the third stage. On and after the fourth stage, the internal splitting of the end may be proceeded by the press-splitting using the splitting punch 3. In addition, the present invention is able to perform not only the intermittent feeding of the long metal material 14 piece by piece individually but also a simultaneous processing on two or more metal plates applying the same processing using a method that transfers two or more materials in a lump. Moreover, it may be practicable to carry out the processing in a manner handling the long metal material 14 as a lead frame, dividing the process for each lead frame, and performing the internal splitting by transferring the workpiece as the lead frame. The progressive transfer method shown in FIGS. 14A and 14B is an example of the press-splitting with the splitting punch. In the present invention, the progressive transfer method is employable also in the case of the press-splitting with the cleaving punch.

As stated above, performing the press-splitting with the splitting punch or the cleaving punch unidirectionally at a predetermined stoke or continuously by the progressive transfer method constructs a method for internal splitting in the cross-section of the end of a workpiece; the method being excellent in productivity and, at the same time, offering a lowered manufacturing cost.

[The 12th Embodiment]

The following describes a method for manufacturing a metal container produced by the method for internal splitting in the cross-section of the end of a metal plate or a metal rod by the present invention. FIGS. 15A to 15E are explanatory drawings of the manufacturing process of the metal container produced by the method for internal splitting in the cross-section of the end of a metal rod 6.

First, using a metal rod 6, a splitting-finished metal rod 16 is manufactured (refer to FIG. 15A), wherein the splitting-finished metal rod 16 has an internal split 5 formed by advancing the internal splitting inside the cross-section of the end of the metal rod 6 by any of the methods described in the second, the fourth, or the fifth embodiment stated previously. Then, the press forming is performed using a splitting-finished metal rod 16 inserting a press die 17, the cross-section of which is circular, in the internal split 5. In this process, an external shape regulating die 18, which is for regulating the external shape and size of the metal rod 16 after processing, is arranged (refer to FIG. 15B) so as to surround the slitting-finished metal rod 16. After the process, the press forming is performed with the press die 17 to create a hollow 19 inside the metal rod 16. Thereafter, the press die 17 is pulled out from the internal split 5 of the metal rod 16 to obtain a metal container 20 thus manufactured (refer to FIGS. 15C and 15D). When needed, a flanged metal container 22 can be manufactured by forming a flange (brim) 21 on the entrance of a metal pipe using a metal die press or laser welding (refer to FIG. 15E).

FIGS. 15A to 15E show an example, in which a die having a circular cross-section is used for the press die 17. In this embodiment however, a press die having a cross-section of any of an elliptical, rectangular, and polygonal shape, other than the above, may be used. As stated above, the selecting of the shape of the press die 17 can change freely the cross-section shape of the above-mentioned metal container 20 or 22. In addition, as for the external shape regulating die 18, the using of an external shape regulating die having a cross-section of any of an elliptical, rectangular, and polygonal shape, other than circular, also can make a metal container have a desired external shape. Furthermore, the depth of the hollow of the metal container 19 and its metal wall thickness can be freely determined within the extent of the design-freedom usually admitted by a person skilled in the art.

Figure 16A:
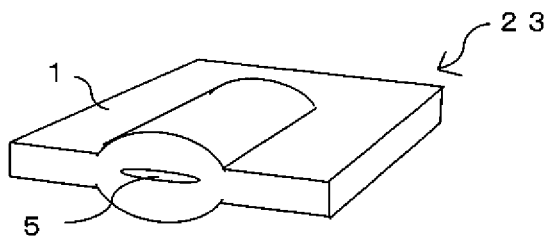
FIGS. 16A to 16E are explanatory drawings of another manufacturing process of a metal container manufactured by the 12th embodiment of the present invention.
Figure 16B:
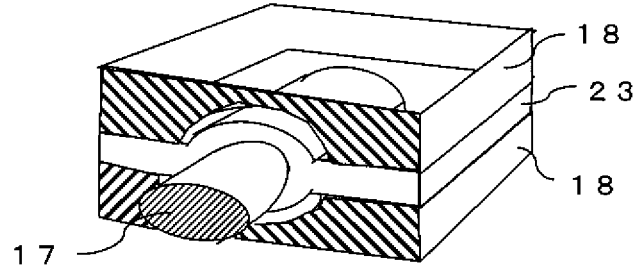
Figure 16C:
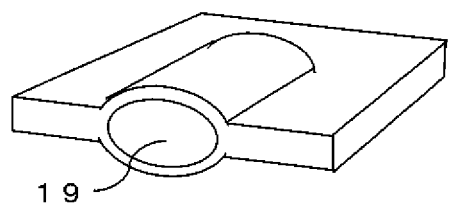
Figure 16D:
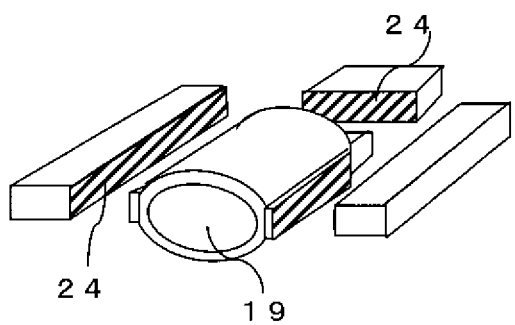
Figure 16E:
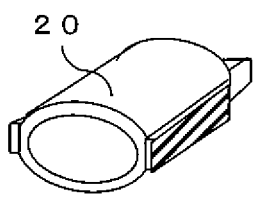

As another method for manufacturing a metal container, a process shown in FIGS. 16A to 16E may be employed. That is, the process includes the steps of:

(a) Forming the internal split 5 in the cross-section of the end of a metal plate 1 to manufacture a splitting-finished metal plate 23 (refer to FIG. 16A);

(b) Inserting the press die 17 having a cross-section of any of a circular, elliptical, rectangular, and polygonal shape inside the internal split of the splitting-finished metal plate 23 and repeating the press-forming to expand the inside of the internal split 5 to the position of the external shape regulating die 18 arranged surrounding the splitting-finished metal plate 23 (refer to FIG. 16B, showing a press die having a circular cross-section as an example);

(c) Taking out the metal plate having the hollow 19 internally after the pulling out of the press die 17 (refer to FIG. 16C);

(d) Cutting the metal plate leaving the hollow 19 and the metal portion that surrounds the hollow 19 using a press, a cutter, or a laser (refer to FIG. 16D); and (e) Taking out the workpiece as a metal container after smoothing a cut face 24 by polishing, grinding, or other similar method (refer to FIG. 16E).

In the processing, the external shape regulating die 18 arranged in the step (b) listed above is used for controlling the external shape and dimensions of the metal plate 23 after processing.

The metal container 20 or the flanged metal container 22 uses a commonly known or publicly known press working method using the press die 17 and the external shape regulating die 18. Therefore, the hollow 19 of a cylindrical shape having an opening at its upper part and a circular cross-section is manufactured accurately and easily. The metal containers 20 and 22 in this embodiment can be manufactured without any need for a subsequent joining process such as welding or brazing. Therefore, processing can be reduced in the number of steps or can be simplified compared to the conventional manufacturing method for metal containers.

Figure 17:
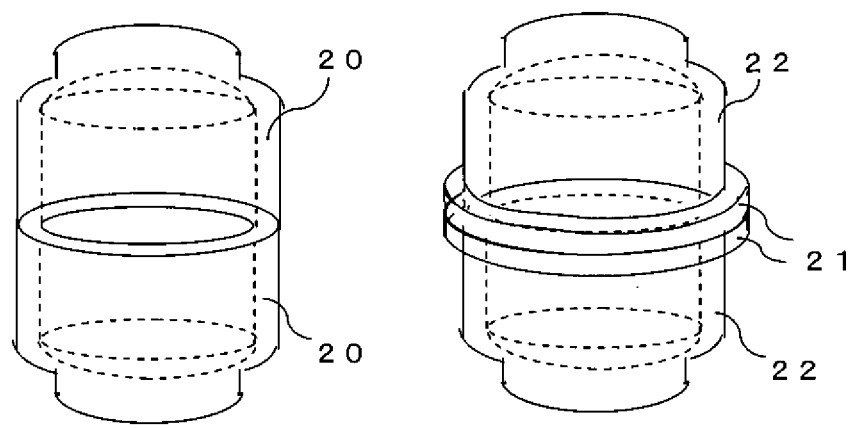
FIG. 17 is a drawing to show a metal container of another form obtained by joining or gluing the metal containers each other, each of which is manufactured by the 12th embodiment of the present invention.

In this embodiment, when manufacturing a heat insulating container, a reserve container for liquid or fluid, or a storage container for gasoline, natural gas, hydrogen, etc. is intended for example, the opening of the metal container 20 or the flanged metal container 22 is joined each other by TIG welding, brazing, or laser welding, or instead, glued, as FIG. 17 shows. With this, a sealed container can be manufactured in a simple manner at low cost. In addition, when an inlet port or an outlet port for liquid or gas is needed in using the sealed container as a heat insulating container, a reserve container, or a storage container, it is practicable to form the inlet port or the outlet port in advance of joining or gluing the metal container 20 or the flanged metal container 22, or instead, it is also practicable to install them after the joining or gluing.

The joined or glued part in the metal containers 20 and 22 shown in FIG. 17 is only their opening, that is, the joined or the glued part is less in number. Therefore, they offer not only the labor saving and simplification in the manufacturing process but also a contribution in improvement of the reliability and the durability to the manufactured metal containers. Further, it is not always necessary that the diameters of the openings of each of the metal containers to be joined or glued should be same. For example, the joining or gluing may be performed in a manner in which one metal container is inserted in the opening of the other metal container. In this embodiment, the openings of the metal containers 20 and 22 have no joining by welding or brazing, nor by gluing; therefore, the opening has an excellent dimensional accuracy and consequently has a feature of an eased fitting between metal containers.

[Reference Example of Manufacturing Metal Containers]

FIGS. 18A to 18F are explanatory drawings of the manufacturing process of the metal container made using the metal rod the end of which is divided into two by the end splitting method disclosed in Japanese Patents No. 5165806 and No. 5219178.

The process shown in FIGS. 18A to 18F includes the steps of:
- (a) Forming a split 26 in an end-split metal rod 25 by repeatedly performing the press-splitting on the end of the metal rod to divide its end into two portions with a splitting punch or a cleaving punch (refer to FIG. 18A);
- (b) Inserting a press die 17 having a cross-section of any of a circular, elliptical, rectangular, or polygonal shape inside the split 26 of the end-split metal rod 25 (refer to FIG. 18B, showing a press die having a circular cross-section as an example.);
- (c) Repeating the press-splitting with the press die 17 to expand the split 26 to the position of an external shape regulating die 18 arranged surrounding the end-splitted metal rod 25 (refer to FIG. 18C);
- (d) Taking out the metal rod 25 having a hollow 19 inside thereof after pulling out the press die 17 (refer to FIG. 18D);
- (e) Manufacturing a metal container 10 by joining the split 26 by TIG welding or laser welding or by gluing using adhesive to manufacture a metal container 10 refer to FIG. 18E); and
- (f) Manufacturing, when needed, a flanged metal container 22 by forming a flange (brim) 21 on the entrance of a metal pipe by metal die press or laser welding (refer to FIG. 18F).

The manufacturing method shown in FIGS. 18A to FIG. 18F permits changing freely the shape of the cross-section of a metal container 20 or the flanged metal container 22 by choosing the shape of the press die 17. In addition, the manufacturing method has an excellent feature as with the present invention in that, with respect to the external shape regulating die 18, the using of such an external shape regulating die as has a cross-section of any of an elliptical, rectangular, and polygonal shape, other than circular, permits a metal container to have a desired external shape. However, as the process in FIG. 18E shows, this manufacturing method needs a process for joining or gluing the split 26 and doing so creates a joining-seam or gluing-seam 27. It is therefore evident that the manufacturing method for a metal container by the present invention is superior to the method that uses the metal rod 26 obtained by the end splitting method shown in FIGS. 18A to 18F in that the manufacturing cost is lowered by simplifying the process and in that the reliability and durability of the metal container are improved.

[The 13th Embodiment]

The method for internal splitting in the cross-section of the end of a metal plate or a metal rod by the present invention is applicable to a method for making an internal split penetrate through. FIGS. 19A to 19D are drawings to show the manufacturing process of a metal pipe having a through-hole formed by this embodiment.

Figure 19A:
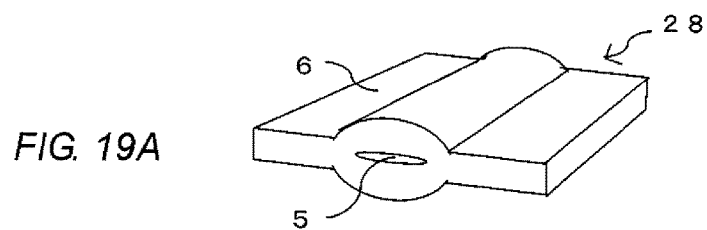
FIGS. 19A to 19D are drawings to show the manufacturing process of a metal pipe which has a through-hole formed by the 13th embodiment of the present invention.
Figure 19B:
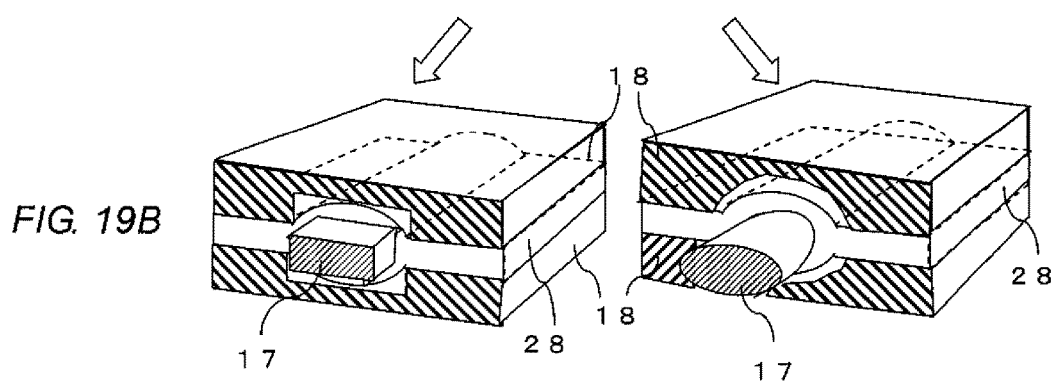
Figure 19C:
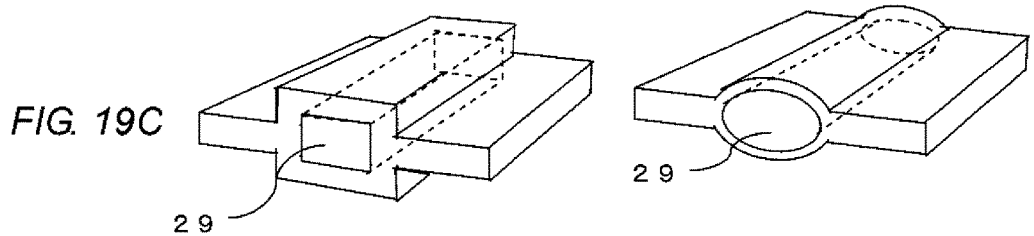
Figure 19D:
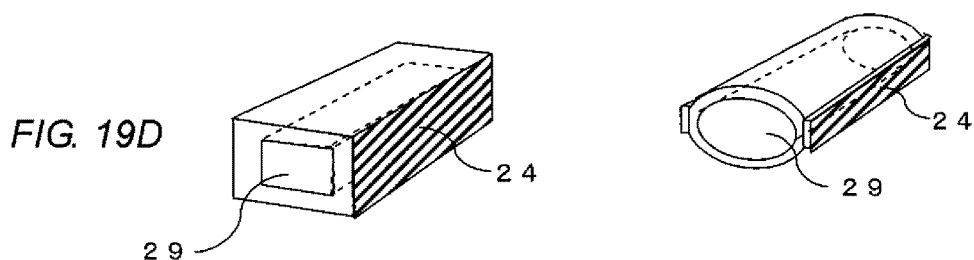

The process shown in FIGS. 19A to 19D includes the steps of:
- (a) Forming the internal split in the cross-section of a metal rod 6 from one end penetrating to the other end thereof to manufacture a metal plate 28 having an internal split 5 as a through hole (refer to FIG. 19A);
- (b) Inserting a press die 17 having a cross-section of any of a circular, elliptical, rectangular, and polygonal shape inside the internal split 5 of the splitting-finished metal plate 28 and repeating the press-splitting to expand the inside of the internal split 5 to the position of an external shape regulating die 18 arranged surrounding the splitting-finished metal plate 28, (refer to FIG. 19B, showing a press die having a rectangular and a circular cross-section as an example);
- (c) Pulling out the press die 17 and thereafter taking out the metal plate having a through-hole 29 internally (refer to FIG. 19C); and
- (d) Cutting the metal plate leaving the through-hole 29 and the metal portion that surrounds the through-hole 29 using a press, a cutter, or a laser (refer to FIG. 19D).

When needed, a process for taking out the workpiece as a metal pipe after smoothing a cut face 24 by polishing, grinding, or other similar method may be included in the step. In the processing, the external shape regulating die 18 arranged in the step (b) listed above is used for controlling the external shape and dimensions of the metal plate 28 after the processing.

Metal pipes or metal tubes have been manufactured conventionally by boring with a drill or drawing, or by joining a curved bent-metal plate as International Publication No. WO 2003/052337 describes. In contrast to this, in the manufacturing method for metal pipes by this embodiment, the shape of the cross-section of the through-hole can be determined by the press die 17 of which cross-section is any of a circular, elliptical, rectangular, and polygonal shape. Therefore, compared to the conventional boring with a drill, the through-hole by this embodiment has an advantage in that the shape of its cross-section can be freely chosen, that is, not only a circular but also an elliptical, rectangular, and polygonal shape can be chosen. In addition, since the press-splitting is performed inserting the press die 17 having a cross-section of any of a circular, elliptical, rectangular, and polygonal shape in the internal split 5, the through-hole 29 can have a smooth and even surface. Furthermore, the press-splitting in this embodiment is useful as a method for low cost manufacturing for metal pipes (or metal tubes), because the press-splitting in this embodiment has a feature that permits higher speed of machining than that of the conventional drilling, drawing, or joining

[The 14th Embodiment]

FIGS. 20A to 20D are drawings to show a joining method of a metal plate 1 or a metal rod 6 and another metal plate or a metal rod 30, wherein the metal plate 1 and the metal rod 6 are given internal split by the method for internal splitting in the cross-section of the end of a metal plate or a metal rod by the present invention. In FIGS. 20A to 20D, the illustrations on the left are longitudinal cross-sectional views of the metal plate or the metal rod 6 and the illustrations on the right are right-side views of the same.

The joining method shown in FIGS. 20A to 20D includes the steps of:
(a) Positioning the another metal plate or the another metal rod 30 so that they can be inserted in an internal split 5 formed on multiple places in the cross-section of the end of the metal plate 1 or the metal rod 6 (refer to FIG. 20A);
(b) Inserting the another metal plate or the another metal rod 30 in the internal split 5 of the metal plate 1 or the metal rod 6 (refer to FIG. 20B);
(c) Press-bonding the metal plate 1 or the metal rod 6 having the internal splits and the another metal plate or the another metal rod 30 by swaging them in the top to bottom direction using a press die 31 to join both the metals (refer to FIG. 20C); and
(d) Joining or gluing after removing the press die 31 where needed, by any of welding or fusing with TIG or laser, bolting, riveting, and adhesive (refer to FIG. 20D).

In this embodiment, it is practicable to join or glue by any of welding, fusing, bolting, riveting, and adhesive, immediately after the process step (b) omitting the press-bonding by the swaging at the process step (c). Although FIGS. 20A to 20D show an example in which three internal splits 5 are formed in the cross-section of the end of the metal plate 1 or the metal rod 6, the internal split 5 in this embodiment may be formed not only at three places but also at one or two, or four or more places.

As stated above, the joining or gluing the metal plate 1 or the metal rod 6 and the another metal plate or the metal rod 30 can be performed by any of conventionally used method, that is, pressing (including forming by swaging), welding, fusing, bolting, riveting, and adhesive. These methods can be applied in combination of two or more methods, for example, pressing and gluing, bolting and gluing, or riveting and gluing. The joining using adhesive is performed by applying an adhesive in the internal split of the metal plate or the metal rod and heating under pressure to proceed the curing of the adhesive, or instead, by heating to melt the applied adhesive then cooling to form a uniform adhesive layer. Alternatively, the joining may be performed by gluing in a manner such that the another metal plate, on the surface of which is applied with adhesive, is inserted in the internal split of the metal plate or the metal rod followed by heating.

It is usually difficult to obtain sufficient joining strength between plates of dissimilar metals. Even if a satisfactory joining strength is obtained initially, the joining strength cannot be ensured stably, because a very brittle inter-metallic compound is formed in the interface between them. Also, when joining the dissimilar metal plates to each other by adhesive, lowering in the adhesion strength due to the difference in the linear expansion coefficient between the two cannot be avoided; thus, ensuring joining reliability has become a great problem. In contrast to this, as FIGS. 20A to 20D show, the performing of the bonding or joining by a conventional method, that is, inserting another metal plate 30 of dissimilar material in the metal plate 1 or the metal rod 6 after forming the internal split in the cross-section of the end of the metal plate 1 or the metal rod 6, improves the strength and reliability of the bonding or joining greatly. As can be known from FIGS. 20A to 20E, in addition, the another metal plate or metal rod 30 of dissimilar material is fixed simply by inserting in the internal split the metal plate 1 or the metal rod 6. Therefore, a complicated process for positioning or fixing is not required and the joining reliability is enhanced, and at the same time the joining cost is reduced greatly.

As stated above, the present invention is able to control the width of the internal split as desired in performing continuously multiple times the press-splitting in the cross-section of the end of a metal plate or a metal rod using a splitting punch or a cleaving punch. Not only that, the present invention is also able to permit regulating the length of the internal split to be within the range freely specified. In addition, it is practicable to form two or more internal splits within the same cross-section of the end of the metal plate or the metal rod. Further, performing the press-splitting by the progressive transfer method offers an excellent productivity and at the same time lowers the manufacturing cost.

Metal components manufactured by the method for internal splitting in the cross-section of the end according to the present invention can be freely changed with respect to the width and length of the internal split. Further, the components so produced can be manufactured into metal containers and metal pipes having a desired form by a post-processing of the press-splitting. Manufacturing metal containers and metal pipes by the present invention is adaptable to omission of or simplification of the joining process. Therefore, a highly reliable and durable metal containers and metal pipes can be manufactured at low cost. Moreover, the metal components manufactured by the method for end splitting by the present invention are easy in the metal component aligning. Therefore, the components permit employing a joining method having an unprecedented high reliability and durability by a simple operation. Thus, it is feasible to expand the application of this method as a simple and low cost joining method in the field that strongly demands a more improved heat resistance and a more enhanced resistance against severer environment.

Accordingly, the method for internal splitting in the cross-section of the end of a metal plate or metal rod, the method for manufacturing of a metal container and a metal pipe by the method for internal splitting, and the method for joining metal components by the present invention are applicable to various use for state-of-the-art equipment in the field of such as motor vehicles, transport equipment such as railway, electrical and electronic equipment, machine tools, heavy electrical equipment, nuclear power equipment, and aviation and space. Therefore the methods have extremely high usefulness.

The invention claimed is:

1. A method for internal splitting in a cross-section in an end of a metal plate having any of a rectangular, polygonal, or elliptical shape, or an end of a metal rod having a cross-section of any of a circular, elliptical, rectangular, or polygonal shape, the method comprising:
 securing the metal plate by pinching both sides thereof with a clamping die, or the metal rod by pinching at least four opposed positions on the circumference thereof with a clamping die; and
 advancing internal splitting by pressing a splitting punch or a cleaving punch having a blade length of 0.8×W to 1.1×W in terms of an intended internal split width W, or by pressing a splitting punch or a cleaving punch after forming a hole or slot at both ends of the intended internal split width, against a crevice of an internal split for repeatedly two or more times until a split length reaches a specified extent, so that a crack generated by the internal splitting does not spread to the peripheral area of the cross-section of the end of the metal plate or the metal rod
 wherein the splitting punch or the cleaving punch having the blade length of 0.8×W to 1.1×W, or the hole or the slot formed at both ends of the intended internal split width is used for determining the width of the internal slit,
 wherein the clamping die has a clamping margin and an alcove opening on at least one side thereof;
 the clamping margin having an abutting length of 0.1×T or more, where the thickness of the metal plate or the diameter of the metal rod is expressed as T, abuts on each of both sides of the metal plate or the metal rod in the area except such an area as corresponds to the intended internal split; and
 the alcove opening is formed on the area except the clamping margin extending to the position same as a tip of the intended internal split from the edge of the end of the metal plate or the metal rod,
 wherein at least one of the clamping die having the clamping margin and the alcove opening is arranged in a place where the end of the alcove opening comes to the position same as the tip of the intended internal split from the edge of the end of the metal plate or the metal rod; and
 another side of the clamping die having the alcove opening is arranged in the place where one end of the alcove opening comes to a position same as the tip of the intended internal split from the edge of the end of the metal plate or the metal rod, or another clamping die different from the clamping die having the alcove opening is arranged so as to hold the metal plate or the metal rod at the same position as the end of the metal plate or the metal rod,
 wherein, in advance of each time of each subsequent internal splitting operation of the two or more times,
 a position of at least one side of the clamping die that pinches both sides of the metal plate in a prior operation of securing or that pinches at least four opposed positions on the circumference of the metal rod in the prior operation of securing, is moved along the metal plate or the metal rod in advance by a stroke corresponding to the distance from a position of the crevice of the internal split toward a distal end of a split-desired portion, following by securing of the metal plate by pinching both sides thereof with the clamping die, or by securing of the metal rod by pinching at least four opposed positions on the circumference thereof with the clamping die, and
 wherein, in each interval between the internal splitting operation of the two or more times, pressing of the splitting punch or the cleaving punch is suspended.

2. A method for internal splitting in the cross-section of the end of a metal plate or a metal rod according to claim 1, wherein the clamping die having the alcove opening has a clamping margin having a length of 0.1×T or more, where the thickness of the metal plate or the diameter of the metal rod is expressed as T, the clamping margin abutting on each side of both sides of the metal plate or the metal rod except such an area as corresponds to the intended internal split, wherein the clamping margins are provided in two directions of parallel and perpendicular to the metal plate or the metal rod.

3. A method for internal splitting in the cross-section of the end of a metal plate or a metal rod comprising the steps of: forming an internal split in the cross-section of the end of the metal plate or the metal rod by the method for internal splitting according to claim 2; moving the clamping position of the clamping die that clamps circumference of the metal plate or the metal rod in the direction perpendicular to the width of the crevice of the internal split in accordance with the position where the internal split is to be formed; performing the internal splitting by abutting the slitting punch or the cleaving punch at a position different from the position of the internal split formed immediately before; and repeating these steps to form two or more internal splits in the cross-section of the end of the metal plate or the metal rod.

4. A method for internal splitting in the cross-section of the end of a metal plate or a metal rod according to the invention according to claim 3, wherein, between the steps of forming an internal split in the cross-section of the end of the metal plate or the metal rod and performing the internal splitting by abutting the splitting punch or the cleaving punch on a position different from the position of the internal split formed immediately before, the closing of the crevice of the last-formed internal split is performed by collapsing using a swaging press.

5. A method for internal splitting in the cross-section of the end of a metal plate or a metal rod according to claim 1, wherein the alcove opening of the clamping die having the alcove opening has a height of 0.2×t to 0.8×t in the direction perpendicular to the width of the internal split when the thickness of the splitting punch or the cleaving punch is t.

6. A method for internal splitting in the cross-section of the end of a metal plate or a metal rod according to claim 5, wherein the clamping die having the alcove opening has a tapered shape in which the height of the alcove opening is formed to be lower toward the tip of the intended internal split from the end of the metal plate or the metal rod.

7. A method for internal splitting in the cross-section of the end of a metal plate or a metal rod according to claim 1, wherein the method further comprising the steps of: forming two or more pairs of holes or slots in the positions corresponding to the position of the intended internal split, wherein such a pair of holes or slots is comprised of holes or slots formed on both ends of the width of the intended internal split; abutting the splitting punch or the cleaving punch on the line that connects holes or slots belonging to each pair to form a crevice; and advancing the internal splitting by performing the press-splitting operation on the crevice one time or repeatedly two or more times using the splitting punch or the cleaving punch to form two or more internal splits in the cross-section of the end of the metal plate or the metal rod.

8. A method for internal splitting in the cross-section of the end of a metal plate or a metal rod according to claim 7, wherein, between the steps of forming the internal split and forming another internal split in a position different from the position of the internal split formed immediately before, the closing of the crevice of the internal split formed immediately before is performed by collapsing using a swaging press.

9. A method for manufacturing a metal container comprising the steps of: inserting a press die in the internal split of the metal plate or the metal rod, the internal split being formed in the cross-section of the end thereof by the method for internal splitting according to claim 1, wherein the press die has a cross-section of any of a rectangular, polygonal, or elliptical shape; and deepening the insertion of the press die toward the depth of the internal split so that the inside room of the internal split is expanded to form a hollow.

10. A method for manufacturing a metal container according to claim 9, wherein the openings of the hollow in the metal components are joined or glued each other, the hollow being formed by expanding the inside of the internal split by inserting a press die having a cross-section of any of a rectangular, polygonal, or elliptical shape, in the internal slit.

11. A method for joining metal components comprising the steps of: inserting another metal plate or another metal rod into the internal split of the metal plate or the metal rod, the internal split being formed in the cross-section of the end thereof by the method for internal splitting according to claim 1; and joining both the metal components mutually by any one of methods of pressing, welding, fusing, bolt-tightening, rivet-tightening, or gluing.

12. A method for joining metal components according to claim 11, wherein the joining between the another metal plate or the another metal rod and the split-having metal plate or the slit-having metal rod is a joining between dissimilar metals.

13. A method for internal splitting in the cross-section of the end of a metal plate or a metal rod according to claim 1, wherein the clamping die having the alcove opening has a sliding core die; and the clamping die is arranged at the position same as the tip of the intended internal split from the edge of the end of the metal plate or the metal rod, sliding the sliding core die in advance at each time of the crevice-forming process and the press-splitting process.

14. A method for internal splitting in the cross-section of the end of a metal plate or a metal rod comprising the steps of: forming an internal split in the cross-section of the end of the metal plate or the metal rod by the method for internal splitting according to claim 1; closing the crevice of the internal slit collapsing using a swaging press die; performing the internal splitting by abutting the splitting punch or the cleaving punch at a position different from the position of the internal split formed immediately before; and repeating these steps to form two or more internal splits in the cross-section of the end of the metal plate or the metal rod.

15. A method for internal splitting in the cross-section of the end of a metal plate or a metal rod according to claim 1, wherein, in the step of internal splitting the metal plate or the metal rod with the splitting punch or the cleaving punch in the direction parallel to the metal plate or the metal rod and in the step of advancing the internal splitting further, the press-splitting with the splitting punch or the cleaving punch is performed in a progressive transfer method composed of separated steps; and, in each press-splitting, the position of at least one end of the clamping die, which pinches both sides of the metal plate or at least two opposed positions on the circumference of the metal rod, is moved in advance in accordance with the distance from the end of the metal plate or the metal rod to the tip of the intended internal split.

16. A method for manufacturing a metal container comprising the steps of: inserting a press die in the internal split of the metal plate or the metal rod, the internal split being formed in the cross-section of the end thereof by the method for internal splitting according to claim 1, wherein the press die has a cross-section of any of a rectangular, polygonal, or elliptical shape; deepening the insertion of the press die toward the depth of the internal split so that the inside room of the internal split is expanded to form a hollow; and cutting the metal plate leaving the hollow and the metal portion that surrounds the hollow using a press, a cutter, or a laser.

17. A method for manufacturing a metal pipe by making the internal split formed in the cross-section of the end of the metal plate or the meal rod by the method for internal splitting according to claim 1, pass through the metal plate or the metal rod to the other end thereof, wherein, when the shape of the cross-section of the internal split is to be changed into a desired shape, a press-forming is additionally performed by inserting a press die having any of a rectangular, polygonal, or elliptical shape into the internal split to form a through-hole having a smooth and even hole-wall face inside the metal plate or the metal rod.

* * * * *